United States Patent
Sidhu

(10) Patent No.: US 12,373,231 B1
(45) Date of Patent: Jul. 29, 2025

(54) GRADUAL OPTIMIZATION OF COMPUTE PLATFORMS FOR A WORKLOAD

(71) Applicant: Amazon Technologies, Inc., Seattle, WA (US)

(72) Inventor: Hamrit Sidhu, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 342 days.

(21) Appl. No.: 17/105,098

(22) Filed: Nov. 25, 2020

(51) Int. Cl.
G06F 9/455 (2018.01)
G06F 9/50 (2006.01)

(52) U.S. Cl.
CPC ........ G06F 9/45558 (2013.01); G06F 9/5027 (2013.01)

(58) Field of Classification Search
CPC .......................... G06F 9/45558; G06F 9/5027
See application file for complete search history.

(56) References Cited

U.S. PATENT DOCUMENTS

| | | | | |
|---|---|---|---|---|
| 9,665,387 | B2 * | 5/2017 | Adogla | G06F 9/45533 |
| 10,057,122 | B1 * | 8/2018 | Andersen | G06F 9/45558 |
| 10,097,627 | B1 | 10/2018 | Gafton et al. | |
| 10,108,455 | B2 * | 10/2018 | Smith | G06F 9/5011 |
| 11,886,926 | B1 * | 1/2024 | Gadalin | G06F 9/4856 |
| 2006/0155912 | A1 * | 7/2006 | Singh | G06F 9/5088 |
| | | | | 711/6 |
| 2014/0337832 | A1 * | 11/2014 | Adogla | G06F 9/45558 |
| | | | | 718/1 |
| 2016/0179560 | A1 * | 6/2016 | Ganguli | G06F 11/3006 |
| | | | | 718/1 |
| 2016/0378524 | A1 * | 12/2016 | Gough | G06F 9/45558 |
| | | | | 718/1 |
| 2018/0046581 | A1 * | 2/2018 | Banerjee | G06F 3/0611 |

(Continued)

OTHER PUBLICATIONS

Zhang, Xiang, et al. "Exploiting data deduplication to accelerate live virtual machine migration." 2010 IEEE international conference on cluster computing. IEEE, pp. 88-96 (Year: 2010).*

(Continued)

*Primary Examiner* — Aimee Li
*Assistant Examiner* — Willy W Huaracha
(74) *Attorney, Agent, or Firm* — Perilla Knox & Hildebrandt LLP; Jonathan A. Paulis

(57) ABSTRACT

Techniques for an optimization service to gradually host workloads of users on more optimized virtual machine (VM) instance types to allow users to gain confidence in recommendations provided by the optimization service. The techniques include providing users with a recommended order of VM instance types that gradually move from a current VM instance type towards more optimal VM instance types. The recommended order may initially recommend that the workload be hosted to a VM instance type that is slightly more optimized that the current VM instance type, but is fairly similar to the current VM instance type. The optimization service may then provide the user with performance data that illustrates how well the new VM instance type performed when hosting the workload. The user may gain trust in the recommendations by observing the performance metrics, and continue to use more optimized VM instance types in the recommended order.

18 Claims, 13 Drawing Sheets

(56) References Cited

U.S. PATENT DOCUMENTS

| | | | | |
|---|---|---|---|---|
| 2018/0060134 | A1* | 3/2018 | Bianchini | G06F 9/5061 |
| 2018/0091625 | A1* | 3/2018 | Hwang | H04L 41/0897 |
| 2019/0026030 | A1* | 1/2019 | Yang | G06F 3/0688 |
| 2019/0342093 | A1* | 11/2019 | Chhabra | H04L 9/0894 |
| 2020/0065126 | A1* | 2/2020 | Zheng | G06F 9/45558 |
| 2021/0042140 | A1* | 2/2021 | Paul | G06F 1/3206 |
| 2021/0247998 | A1* | 8/2021 | Zhang | G06F 9/5083 |
| 2021/0342199 | A1* | 11/2021 | Bhatnagar | G06F 9/5083 |
| 2024/0354218 | A1* | 10/2024 | Balachandriah | G06F 11/3433 |

OTHER PUBLICATIONS

Xiao, Ai, et al. "ORHRC: Optimized recommendations of heterogeneous resource configurations in cloud-fog orchestrated computing environments." 2020 IEEE International Conference on Web Services (ICWS). IEEE, pp. 404-412. (Year: 2020).*

* cited by examiner

300

OPTIMIZATION ENROLLMENT
Choose an opt-in preference:

302 — ○ Optimized Instance Type Recommendations

If you choose this option, the optimization service collects and analyzes data for workloads in your account and identifies instance types that are most optimal for your workloads. These recommended instance types attempt to minimize over-provisioned instances as well as under-provisioned instances.

304 — ● Gradually-Optimized Instance Type Recommendations

If you choose this option, the optimization service collects and analyzes data for workloads in your account and identifies instance types to gradually move you from your current instance type to instance types that are most optimal for your workloads. The initial recommended instance types are similar to your current instance type, and the final recommended instances types are the most optimal for your workloads.

306 — Instance Type – The instance type that you would like to enroll

[VM_Instance_Type_1 ▼]

308 — Risk strategy – The acceptable risk for your gradual recommendations

[e.g., low risk, moderate risk, high risk, etc.) ▼]

310 — Primary Optimization Area – The computing resource that you want optimized for this workload

[e.g., compute-heavy workload, memory-heavy workload, etc.) ▼]

312 — Gradual-Optimization Process – Select the level of oversight you would like for the gradual-optimization process 314 — ● Manual review and approval 316 — Specify the time interval between provisioning workload and reviewing performance

[14 days ▼]

318 — ○ Automated

[Cancel] [Generate Gradual-Optimization Plan] — 320

FIG. 3

GRADUAL OPTIMIZATION OF COMPUTE PLATFORMS FOR A WORKLOAD

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single physical computing device to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

To further increase the utilization of the computing resources, and also to more effectively meet the computing resource needs of users, service provider networks may offer a variety of different types of virtual machines. Specifically, a service provider network may offer a selection of VM instance types that are optimized, or biased, to support different use cases on behalf of users. In such examples, the different VM instance types may be allocated different amounts, and/or different combinations, of the computing resources of underlying physical computing devices to provide users with flexibility to choose a VM instance that is more appropriately optimized to support their computing resource needs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a graphical user interface through which a user of a service provider network can opt-in for a gradual-optimization recommendation for launching a workload on increasingly optimized VM instances.

DETAILED DESCRIPTION

Figure 1:
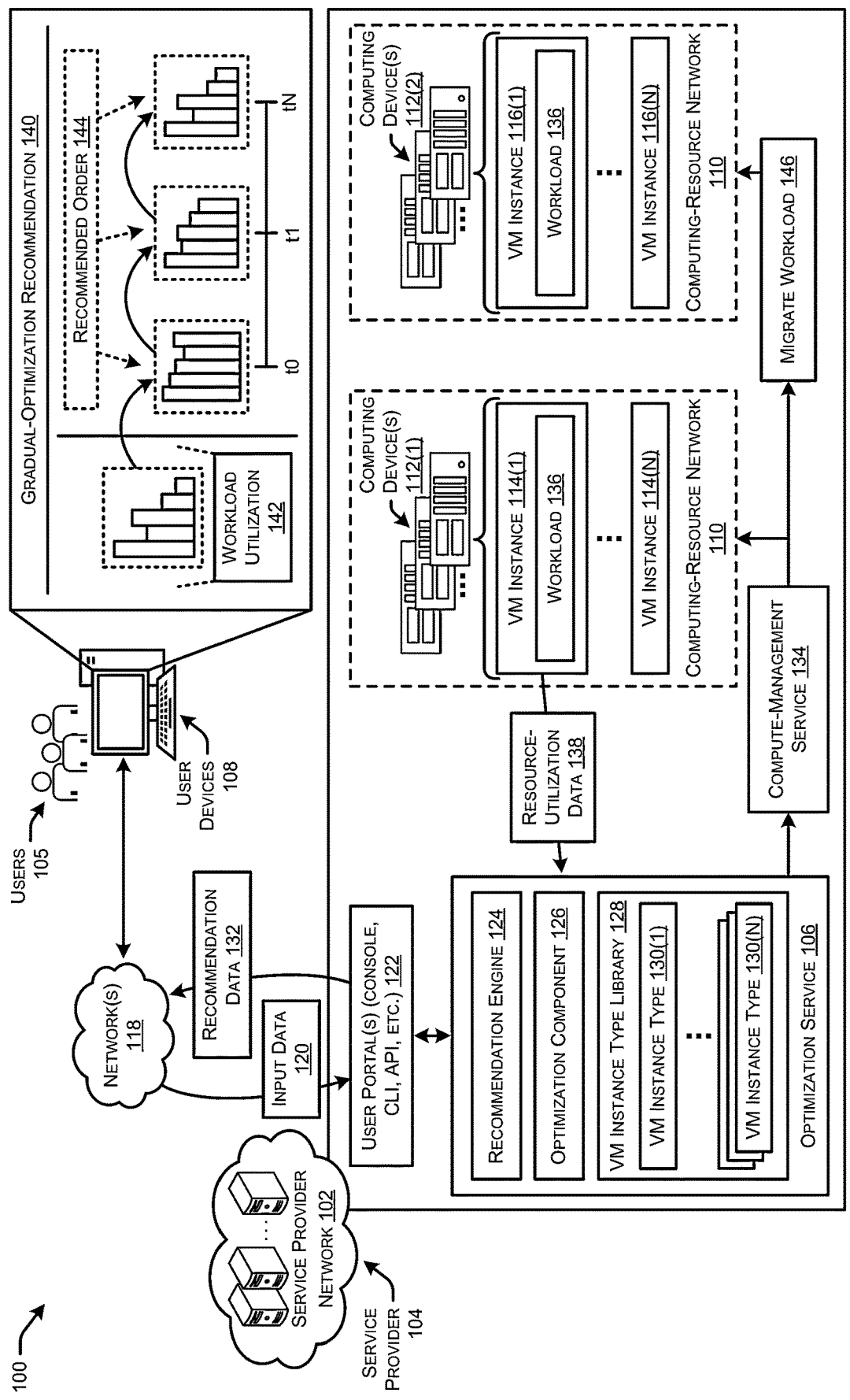
FIG. 1 illustrates a system-architecture diagram of an example environment in which an optimization service of a service provider network determines a gradual-optimization recommendation of VM instance types that are optimized to support workloads on behalf of users.

Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

As noted above, the service provider networks may utilize virtualization technologies such that the computing devices can each host multiple VM instances that appear and operate as independent computing devices to support workloads of users. Rather than allocating all of the computing resources of a physical computing device to support a single workload for a user, the computing resources of a physical computing device can be allocated amongst multiple VM instances that support different workloads. The service provider network supports many different types of workloads on behalf of users, and these workloads often have different computing resource needs. As described herein, a workload is implemented by a designated set of computing resources and the workload itself can be considered as code or logic that performs functionality using the computing resources. The service provider network may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a service provider network.

In light of the different workloads that are supported on behalf of users, the service provider network may provide users with a selection of a variety of VM instance types optimized to support different workloads. Generally, each VM instance type may be allocated a different amount of computing resources, and/or different combination of computing resources, such that the VM instance types are optimized, or computationally biased, to support different workloads. As used herein, computing resources refers to compute, memory, storage, networking, and, in some implementations, graphics processing. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing underutilization of computing resources by the service provider network.

Generally, an increase in the complexity and diversity of VM instance types offered by the service provider network is advantageous and results in a higher likelihood that workloads are supported by a more optimized VM instance. While a large variety of VM instance types is advantageous for various reasons (e.g., efficient utilization of computing resources, high performance for workloads, etc.), it also may become difficult for users, particularly new users, to select a suitable or appropriate VM instance type to support their workload(s). For example, users may attempt to map out the computing resource needs of their workload and then peruse the offering of VM instance types to locate a VM instance type that seems appropriate for their needs. In other examples, users may go through a time-consuming trial-and-error process to analyze performance of their workloads using different VM instance types. However, not only is this time consuming, but it may also result in users having their workloads hosted on VM instance types that are either overutilized and resource constrained, or underutilized and resulting in computing resources that may be unused and sitting idle. As an example, users may be overly cautious and select an oversized VM instance type to help ensure that their workloads are never resource constrained, which may result in low utilization of computing resources of the service provider network.

In some instances, service provider networks may provide an optimization service to help users optimize the selection, configuration, and utilization of VM instance types to support their workloads. The optimization service may provide recommendations to users that help improve performance of their workloads, and that also increase the aggregate utilization of computing resources of the service provider network. While the optimization service may perform techniques to help new users select a VM instance type that is optimized to host or support their workload, the new VM instance type that is recommended may be drastically different than the current VM instance type that is hosting the workload. Although the recommended VM instance type may be more optimized for hosting the workload, users may be hesitant to move away from the current VM instance type that has been working to host their workload to a new VM instance type that is so different. Accordingly, users may be hesitant to accept the recommendations of the optimized VM instance types.

This disclosure describes techniques for an optimization service to gradually provision workloads of users onto increasingly optimized VM instance types to gradually allow users to gain confidence in the recommendations provided by the optimization service. Rather than identifying the most optimized VM instance type for a workload and recommending that a user host their workload on that VM instance type, the techniques described herein include providing users with a recommended order of VM instance types that gradually move from the current VM instance type towards the more optimal VM instance types. For instance, the recommended order may initially recommend that the workload be migrated to a VM instance type that is slightly more optimized that the current VM instance type, but is similar to the current VM instance type (e.g., in a same family of VM instance type offerings). The optimization service may then provide the user with performance data that illustrates how well the initial VM instance type performed when hosting the workload. The user can see how well the initial VM instance type performed while hosting their workload, and determine to continue to use the increasingly optimized VM instance types in the recommended order. In this way, users may gain trust in recommendations provided by the optimization service and gradually move their workloads to be hosted on more optimized VM instance types.

In some instances, users will request or opt-in for use of a gradual-optimization service that performs the techniques described herein. The gradual-optimization service may receive various input from the users to help generate the recommended order of gradually more optimized VM instance types. For instance, the users may provide input data such as a risk strategy (e.g., low-risk recommendations, high-risk recommendations, etc.) that indicates an amount of risk that is tolerable for hosting the workloads on new VM instance types. Further, the users may provide input data such as what computing resource type they would like to have optimized (e.g., focus on CPU optimization, focus on memory optimization, etc.). The gradual-optimization service may take into account the risk strategy and/or primary computing resource type that is to be optimized and generate a recommended order of VM instance types that gradually become more optimized for the workload. The gradual-optimization service may then output recommendation data to accounts of the users that indicate the recommended order of VM instance types that gradually become more optimized for the workloads. The users may then view the recommended order of VM instance types that are gradually more optimized for their workloads, and determine whether or not they would like to opt-in for use of the recommended order.

In some instances, the users may trust the gradual-optimization service to monitor the workloads on the new VM instance types for a period of time and, if the new VM instance types performed well (e.g., satisfied a performance threshold), the gradual-optimization service may automatically being hosting the workloads on the next optimized VM instance type in the recommended order. In this way, the gradual-optimization service may automatically progress the workloads of the users through recommended orders of VM instance types until the gradual-optimization service identifies an optimal VM instance type in the recommended order for the workloads.

In other examples, the users may request performance metrics after the workloads have been hosted on new VM instance types in the recommended order after a period of time. That is, the users may provide time periods (e.g., 7 days, 14 days, etc.) that the workloads are to be hosted on a recommended VM instance type in the recommended order, and receive performance metrics after the time period. The performance metrics may generally indicate performance of the VM instance type for hosting the workload (e.g., data throughput compared to computing resources allocated to the VM instance type supporting a workload). The user may then view the performance metrics, and determine whether they would like to continue in the recommended order and host their workloads on more optimized VM instance types, stay on the current VM instance type, or revert back to the original VM instance type. In this way, users may be provided with more control over the hosting of their workloads on different VM instance types in the recommended order.

Although the techniques described herein are described primarily with respect to determining a VM instance type for a workload, and provisioning a VM instance to support the workload, the techniques are equally applicable for any number of VM instances and/or workloads. For example, a workload may be supported by a VM instance, by multiple VM instances, and/or by a fleet of VM instances. In some examples, one or more workloads may be supported by a fleet of VM instances that are scalable to support increases and decreases in use, and may be placed behind one or more load balancing devices of the service provider network. In such examples, the techniques described herein may be applicable to all VM instances in a fleet that support various instances of the same workload.

This application describes techniques that increase the overall utilization of computing resources provided by servers or other hardware devices, such as CPU, GPU, memory, disk, and/or network availability. The optimization service may determine an order VM instance types that gradually become more appropriately tailored, or allocated a more appropriate amount of computing resources, to support workloads. In this way, the techniques described herein help prevent underutilization of computing resources of a service provider network, which reduces the amount of computing resources that are (i) allocated or reserved for VM instances, but (ii) sit idle or unused because the VM instances are oversized for the workload they support. Additionally, the techniques improve the performance of workloads by intelligently placing workloads on VM instance types that are computationally biased or optimized to support the workloads. The optimization service may gradually place the workloads on more optimized VM instances to help ensure that the workloads have sufficient amounts of computing resources available, of the types of computing resources needed, to help avoid over constrained VM instance types and workloads.

Although the techniques described herein are with reference to virtual machines or VM instances and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container, a virtual machine, a serverless network function, processes, software, and/or any other executable that is allocated portions of physical computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an optimization service of a service provider network determines a gradual-optimization recommendation of VM instance types that are optimized to support workloads on behalf of users.

As illustrated, a service provider network 102 may be operated and/or managed by a service provider 104. The service provider network 102 may provide various services to users 105 to fulfil their computing resource needs, such as cloud-based computing resources. For example, the service provider network 102 may provide cloud-based, scalable, and network accessible compute power services, storage services, database services, and/or other services. Users 105 may utilize user devices 108 to subscribe for use of the computing resources and/or services provided by the service provider network 102. The service provider network 102 may include an optimization service 106 that is configured to select VM instance types to support workloads of the users 105 which optimize performance of the workloads, and refrain from underutilization or overutilization of the computing resources that support the VM instances and workloads.

Generally, the optimization service 106 may recommend optimal compute resources for users' workloads to reduce costs and improve performance by using machine learning to analyze historical utilization metrics. Over-provisioning compute can lead to unnecessary infrastructure cost and under-provisioning compute can lead to poor application performance. The optimization service 106 may help users choose optimal instance types, including those that are part of an auto scaling group, based on utilization data. By applying the knowledge drawn from running diverse workloads in the cloud (or service provider network 102), the optimization service 106 identifies workload patterns and recommends optimal compute resources. The optimization service 106 analyzes the configuration and resource utilization of a user's workload to identify dozens of defining characteristics, for example, if a workload is CPU-intensive, or if it exhibits a daily pattern or if a workload accesses local storage frequently. The optimization service 106 processes these characteristics and identifies the hardware resource headroom required by the workload. The optimization service 106 infers how the workload would have performed on various hardware platforms (e.g. VM instances types) and offers recommendations. Users can opt-in to the optimization service 106 via a console.

The service provider network 104 may span across different geographic regions, and include or be associated with a computing resource network 110 that includes clusters of managed computing devices 112 (e.g., servers) stored in data centers located across the different geographic regions. In this way, users 105 who have subscribed for use of the network-based services supported by computing resources in the data centers 116 need not invest in and maintain the computing infrastructure required to implement the various services that they may need. In some examples, users 105 of the service provider network 102 may access or utilize computing resources of the computing devices 112 in the data centers located in different geographic regions such that users 105 located in these different geographic regions are provided with access these resources and services.

Generally, the computing devices 112 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 112 may be various types of computing devices, such as devices that have different chip set generations, are from different vendors, have different hardware architectures, and so forth.

Thus, the computing resources of the computing-resource network 110 provided by the computing devices 112 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 112 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines and containers (as described below), serverless functions, logical data storage volumes capable of storing files and other data, software programs, data processing services, and the like.

As illustrated, the computing devices 112 may each support VM instances that may be different types of VM instances provided by the service provider network 102. For instance, computing devices 112(1) may support one or more VM instances 114(1)-114(N) that are of a first VM instance type, and computing devices 112(2) may support one or more VM instances 116(1)-116(N) that are of a second VM instance type. Rather than allocating all the computing resources of an entire computing device 112 to support a workload for the user 105, the service provider network may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices 112. These VM instances 114/116 may emulate computing devices 112 to operate and support workloads, and may have their own operating systems, processing capabilities, storage capacity, and network connections or interfaces.

Users 105 may create user accounts with the service provider 104 to utilize the resources and services of the service provider network. The users 105 may utilize their user devices 108 to communicate over one or more networks 118 (e.g., WANs, PANs, LANs, etc.) with the service provider network 102. The user devices 108 may comprise any type of computing device configured to communicate over network(s) 118, such as mobile phones, tablets, laptop computers, desktop computers, televisions, servers, and/or any other type of computing device. The users 105 may desire that the service provider network 102 host or support workloads on the computing-resource network 110 that is managed by the service provider 104. Accordingly, the users 105 may, via their user account, request that a workload be launched on their behalf, and provide workload data 120 via one or more user portals 122 (e.g., web console, command line interface (CLI), application programming interface (API), etc.). The user portals 122 may provide the workload data 120 to the optimization service 106 which includes a recommendation engine 124, an optimization component 126, and a VM instance type library 128 storing indications of different VM instance types 130(1)-130(N) offered by the service provider network.

As described herein, a workload 136 may generally include a designated collection or grouping of computing resources (e.g., compute, memory, storage, networking, etc.) in the computing-resource network 110, and the code or logic that performs functionality using the computing resources. The service provider network 102 may support a wide variety of workloads 136, such as web servers, databases, customer-facing applications, distributed data stores, batch processing, machine/deep learning training and/or inference, online gaming, video encoding, memory caching, and/or any other type of workload that can be supported by computing resources of the computing-resource network 110.

The user 105 may provide input data 120 that generally indicates characteristics of a gradual-optimization recommendation that is to be provided to the user 105. In some instances, the optimization service 106 may provide a wizard that is accessible to the user 105 via their user account and presents, via the user portal(s) 122, user interfaces to the user device 108 that are configured to receive the input data 120 that defines the user's 105 preferences around the gradual-optimization recommendation that is to be provided for the workload 136 of the user. The wizard may present user interface(s) that include text-input fields to receive a risk strategy for the gradual-optimization recommendation/plan, an indication of a primary computing resource that is to be optimized for hosting the workload 136, a time period indicating when the user 105 would like to be provided with performance metrics for the new VM instance types, etc. Further description of the console or wizard is found below with respect to at least FIG. 3.

The optimization service 106 includes the optimization component 126 that is configured to determine an order of VM instance types 130 that are gradually more optimized to support the workload 136 on behalf of the user 105. The service provider 102 may offer a wide variety of VM instance types 130 that differ based on (i) the amounts of physical computing resources allocated for use by the VM instance type 130, and/or (ii) the combinations of the types of physical computing resources allocated for use by the VM instance type 130. In some instances, there may be at least five high-level categories or types of computing resources included in the computing-resource network 110 and provided by the computing devices 112, which are CPU, GPU, memory, storage, and network throughput. The different VM instance types 130 are allocated different amounts and/or combinations of these, and potentially other, computing resources. For example, the VM instance types 130 may be allocated use of larger or smaller amounts of the different resource types to be computationally biased or optimized support workloads 136 with various computing resource utilization characteristics.

For example, the VM instance types 130 can include compute optimized types, memory optimized types, accelerated optimized types, storage optimized types, and/or network throughput optimized types. As a specific example, a VM instance type 130 that is compute optimized may be allocated use of 4 vCPUs of 3.0 GHz processors where each core can run at up to 3.5 GHz, but only be allocated 8 gibibytes (GiB) of memory. Conversely, a VM instance type 130 that is memory optimized may be allocated 32 GiB of memory, but only run on a 3.1 GHz processor with 2 vCPUs.

In addition to biasing the VM instance types 130 by varying the amounts or ratios of computing resource types allocated for use by the different VM instance types 130, the service provider 104 may further include different sizes of VM instance types 130 for workloads 136 that require more or less computing resources at various ratios. For example, a smaller VM instance type 130 that is computationally biased may be allocated 2 vCPUs of a 3.0 GHz processor and 4 GiB of memory, and an extra-large VM instance type 130 that is computationally biased may be allocated 72 vCPUs on the 3.0 GHz processor and 144 GiB of memory (e.g., 36× the vCPUs and memory allocation of the smaller type).

Accordingly, the service provider 104 may offer a wide selection of VM instance types 130 that are included in a VM instance type library 128 in which a user 105 can search and select a desired VM instance type 130 for their workload 136. Traditionally, the users 105 would have to mentally map out the computing resource needs of their workload 136 and peruse the library 128 offering of VM instance types 130 to locate a VM instance type 130 that seems appropriate for their needs. However, not only is this time consuming, but it may also result in users 105 having their workloads hosted on VM instance types 130 that are either overutilized and resource constrained, or underutilized and resulting in computing resources that may be unused and sitting idle.

The optimization component 126 may be configured to determine a recommended order of VM instance types 130 that are gradually more optimized to host or support the workload 136. For example, the optimization component 126 may generally map the workload data 120 (e.g., resource-utilization data, description of the workload 136, etc.) to multiple different VM instance types 130 that are computationally biased, or optimized, to support the resource utilization of the workload 136. In some examples, and described in more detail with respect to FIG. 2, the optimization component 126 may generate predefined workload categories or groups that generally represents higher-level categories of workloads 136 commonly hosted on the computing-resource network 110. For example, one workload category may be a database category and represent different database workloads supported by the computing-resource network 110. Another category may be a web-server category and represent the different web-server workloads supported by the computing-resource network 110. The optimization component 126 may analyze the different types of workloads 136 supported across the computing-resource network 110 on behalf of the user accounts and define (e.g., machine learning, clustering, etc.) a set of workload categories that are generally representative of the different workloads 136 supported by the computing-resource network 110.

Further, the optimization component 126 may determine one or more resource-utilization models for each workload category that represent the general "shape" or characteristics of the resource utilization by the workloads 136 represented in each category. That is, each workload category may be associated with one or more resource-utilization models that are generally representative of the resource consumption by workloads 136 in the workload category. The optimization component 126 may further determine, based on the resource-utilization models (or by user account selection) which of the VM instance types 130 are computationally biased or optimized for the different workload categories. As an example, VM instance type 130 that are compute optimized may be associated with a high-performance web server workload category, whereas a VM instance type 130 that is memory optimized may be associated with a higher-performance database category. In this way, workload categories may be generated or predefined that are representative of the resource-utilization characteristics for the workloads 136 that are supported by the computing-resource network, and also indicate the VM instance types 130 that are optimized or biased to support the workloads for each workload category.

The optimization component 126 may map the workload data 120 to at least one of the predefined workload categories in various ways. For instance, the workload data 120 may include one or more words that describe the resource-utilization data of the workload 136, such as "web server," "database," "compute heavy," and so forth. In some examples, the optimization component 126 may simply map actual utilization data of the workload 136 to a workload category. After the optimization component 126 maps the workload data 120 to one of the predefined workload categories, the recommendation engine 124 may provide recommendation data 132 to the user device 108 that includes a gradual-optimization recommendation 140 of a recommended order 144 of VM instance types 130 that are gradually more optimized to support their workload 136.

The recommendation engine 124 may determine multiple of the VM instance types 130 associated with the workload category, and may further rank the VM instance types 130 based on how strongly the workload data 120 corresponds to one of the VM instance types 130 for that workload category. Depending on the size (e.g., amount of resources), and/or the combination of computing resources, for the workload 136, the recommendation engine 124 may determine a ranked listing of VM instance types 130 that are recommended for the workload data 120. The recommendation engine 124 may use the ranked listing to determine the recommended order 144. For instance, the recommendation engine 124 may determine that the lowest (or a lower)

ranked VM instance type 130 is more similar to the current VM instance 114 and should be the first VM instance type 130 in the recommended order 114. The highest ranked, or most optimal, VM instance type 130 may be the final VM instance type 130 in the recommended order 144 depending on the risk strategy of the user 105.

In some examples, the recommendation engine 124 may further provide suitability data that indicates how suitable the recommended order 144 of VM instance types 130 are for supporting the workload 136, such as indicating a number of stars out of five stars, percentages indicating how suitable out of one-hundred percent, and/or any other suitability score or indicator. Further, the recommendation engine 124 may provide a textual explanation regarding why the VM instance types 130 are optimized to support the workload 136 such that the user 105 may make a more intelligent decision as to on which of the VM instance types 130 they would like to launch their workload 136.

The recommendation data 132 may be sent to a user device 108, and the user device 108 may present a gradual-optimization recommendation 140 that indicates at least a workload utilization 142 of the workload 136 as well as a recommended order 144 of VM instance types 130. As illustrated, the recommended order 144 may include VM instances 130 that gradually become more optimized to host the workload 136. That is, each VM instance type 130 in the recommended order 144 is allocated different amounts of computing resources such that at least one of the over-provisioning of resources and/or under-provisioning of resources is continually reduced as the workload 136 is progressively hosted on the VM instance types 130 in the recommended order 144.

The gradual-optimization recommendation 140 may be presented in a dashboard accessible via the user portal(s) 122, and the user 105 may select whether or not they would like to opt-in to use the gradual-optimization recommendation 140 and host their workload 136 on the recommended order 144 of VM instance types 130.

The optimization service 106 may receive additional input data indicating a selection of an instruction to apply the recommended order 144. The optimization service 106 may provide a compute-management service 134 an instruction to gradually/progressively launch the workload 136 on one or more (e.g., a fleet) of VM instances 114 that correspond to the recommended order 144 of VM instance types 130 that the user 105 selected. In some examples, the workload 136 may include code provided by the user 105, and/or generated by the service provider network 102, to implement functionality of the desired workload 136. For example, the service provider network 102 may provide services that generate code for the workload 136, including an application stack and/or other programs, to implement the workload 136. The workload 136 may be supported by one VM instance 116, and/or a fleet of VM instances 116. In some examples, one or multiple VM instances 116 in a fleet of VM instances 116 may support respective workloads 136 on behalf of the user account of the user 105. The compute-management service 134 may further deploy one or more load balancers in front of the fleet of VM instances 116 to scale the workload(s) 136, and other configurations or devices (e.g., security groups) to support the workload. In this way, the optimization service 106 may help a user 105 select, configure, and utilize a recommended order 144 of VM instance types 130 that are gradually more optimized to support a workload 136 for the user's 105 account.

In such examples, the optimization service 106 may provide an instruction to the compute-management service 134 to periodically, and potentially upon receiving approval from the user 105, migrate the workload 146 to be hosted on more optimized VM instances 116(1)-(N) in the recommended order 144 that correspond to the VM instance type 130 that was determined to be more optimized for the workload 136.

Generally, the optimization service 106, and components thereof, may comprise software, firmware, and/or other logic that is supported one computing device, or across more computing devices in the service provider network 102. Additionally, the optimization service 106 may comprise a system of other devices, such as software agents stored locally on VM instances 114/116.

Figure 2:
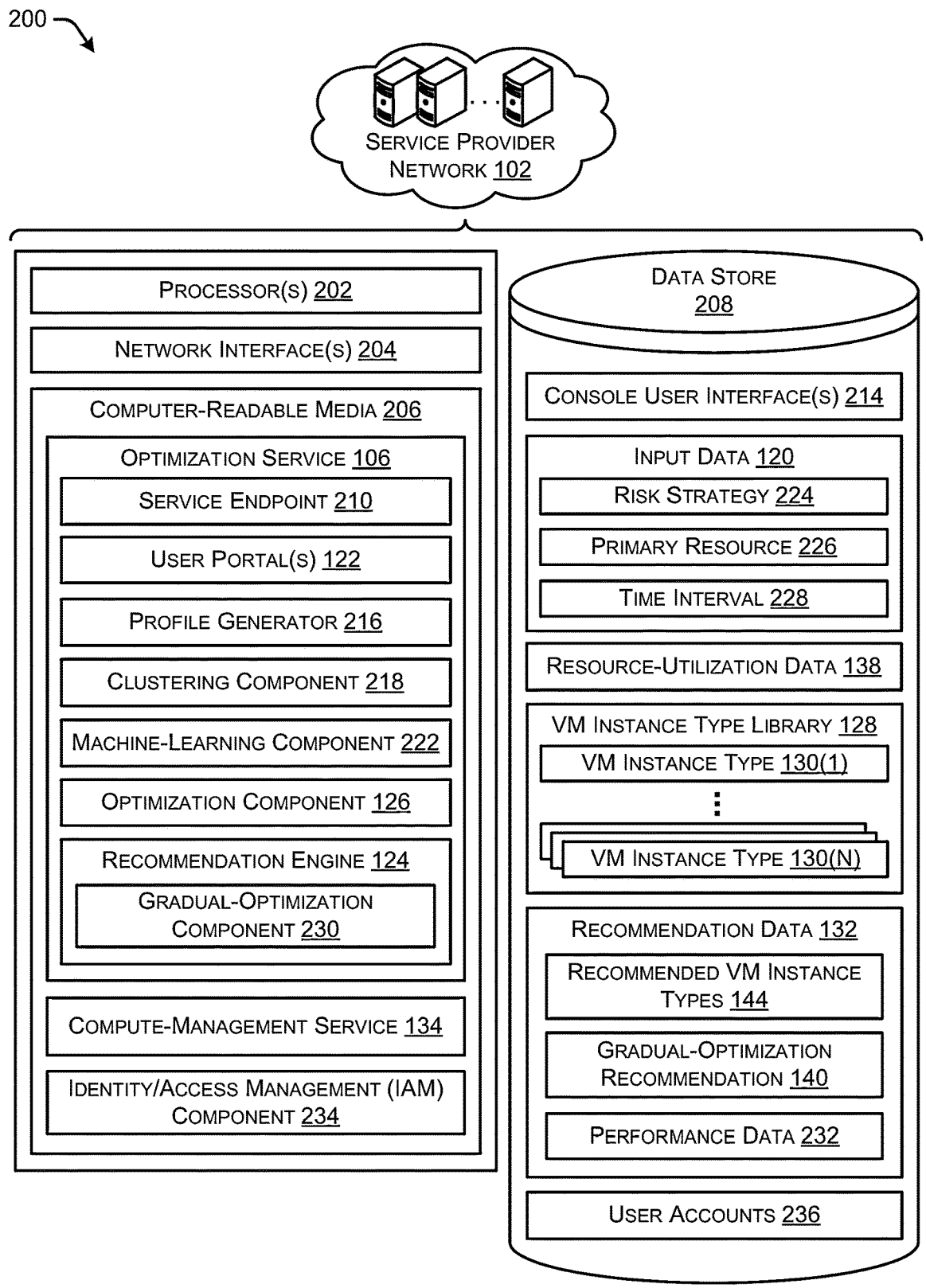
FIG. 2 illustrates a component diagram of example components of a service provider network that help gradually optimize the selection, configuration, and utilization of VM instance types to support workloads on behalf of users.

FIG. 2 illustrates a component diagram 200 of example components of a service provider network 102 that help gradually optimize the selection, configuration, and utilization of VM instance types 130 to support workloads 130 on behalf of users 105.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s) 108, computing devices 112, and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the optimization service 106 described herein. For instance, the computer-readable media 206 may store a service endpoint 100 that may include a stack that supports internet routable APIs to describe, generate, delete, and make recommendations using resource-utilization data 138 or characteristics. Generally, this service stack of the service endpoint 100 may support APIs, CLI, consoles, SDKs, and/or any other function through which the components of the optimization service call, and/or the user devices 108.

The computer-readable media 206 may further store the user portal(s) 122 through which users 105 can provide input via their user accounts and user devices 108. In some examples, the user portal(s) 122 include an interface through which users 105 can provide input data 120. The user portal(s) 122 may include the web-console wizard which presents one or more console user interface(s) 214 (or UIs 214) through which the users 105 may provide input data 120 that defines or describes preferences for their gradual-optimization recommendation 140. The service endpoint 210 may receive calls from APIs, CLIs, SDKs, and/or other electronic means or methods.

The computer-readable media 206 may further store a profile generator 216 that generates a snapshot of profiling data, such as a resource-utilization characteristic included in the resource-utilization data 138, at regular intervals. The profile generator 216 may then utilize these snapshots to create a resource fingerprint for a workload 136, which generally represents the resource consumption of the workload 136. These fingerprints or profiles may be included in the resource-utilization data 138 and be mapped to VM instance types 130 and/or workload categories for the workload 136. The profile generator 216 may further accumulate and average all resource-utilization data 138 for a fleet of VM instances 114/116 in order to generate a consumption fingerprint for a fleet of VM instances 114/116.

The computer-readable media 206 may further store a clustering component 218 configured to create or generate the workload categories 110. The clustering component 218 may obtain historical (or near-real time) utilization data 138 and cluster the workloads 136 for some or all of the user accounts of the service provider network 102 to generate the workload categories that are generally representative of all the workloads 136 in the service provider network 102.

The computer-readable media 206 may further store a machine-learning (ML) component 222 configured to generate the resource-utilization models for each of the workload categories. The ML component 222 may perform various techniques, and utilize various ML algorithms, to train one or more resource-utilization models that represent resource-utilization characteristics representative of the workloads 136 in each workload category. In this way, when a new workload 136 needs to be categorized for purposes of identifying optimized VM instance types 130, the resource-utilization data 138 for the new workload 136 may be mapped to the resource-utilization model that is "closest" or "most near" (e.g., neural network models) the fingerprint of the resource-utilization data 138 for the new workload 136. The ML component 222 may utilize any type of ML algorithm or technique to train the resource-utilization models.

The computer-readable media 206 may further store the optimization component 126 configured to perform techniques described above for mapping resource-utilization data 138 to the appropriate workload categories 110, such as machine-learning methods or ruled based methods. For example, the optimization component 126 may compare utilization by the workload 136 for one or more dimensions of compute (e.g., CPU, GPU, memory, disk, and/or network throughput) with the resource-utilization models to identify closest match across the one or more dimensions of compute. The optimization component 126 may further determine which of the VM instance identifiers are associated with the workload categories, and provide the user(s) 106 with indications of the optimized VM instance types 130 that are optimized for their workload 136.

The optimization component 126 may include a gradual-optimization component 230 that is configured to determine the gradual-optimization recommendation 140 that includes the recommended order 144 of VM instance types 130 that are optimized to host a workload 136 of a user 105. The gradual-optimization component 230 may identify VM instance types 130 that gradually move from being similar to the current VM instance 114 (e.g., in the same instance family, similar resource allocation, etc.), and through the recommended order 144 to a VM instance type 130 that is more optimal for hosting the workload 136. The recommended order 144 may include two or more VM instance types 130 that progressively become more optimized to host the workload 136.

The computer-readable media 206 may further store the recommendation engine 124 that is configured to generate and provide recommendation data 132 to the user device 108 to recommend VM instances 116 on which to host workloads 136, and also to recommend a gradual progression VM instance types 130 are more optimized for the workload 136. The recommendation engine 124 may generate recommendation data 132 including a VM instance type recommended order 144 (e.g., list of VM instance types 130 that gradually progress based on suitability for the workload 136), suitability/risk scores that indicate how suitable or optimized a VM instance type 130 is for the workload 136, and/a textual explanation 122 that details why a VM instance type 130 is optimized for the workload 136. The recommendation engine 124 may, if the user 105 opts in for a recommendation, provide recommendation data 132 to the user devices 108 to help users 105 gradually move their workloads 136 to move optimized VM instance types 130.

The suitability/risk scores may indicate various data regarding how suitable a VM instance type 130 is to support a workload 136. For example, the suitability/risk scores may indicate only how suitable a VM instance type 130 is to support a workload 136 using various numeric, text-based, and/or other scoring means. In some examples, the suitability/risk scores may only indicate how risky a VM instance type 130 is to support a workload 136 using a scoring means (e.g., risk of bottlenecks). In some examples, there may be multiple suitability/risk scores indicating risk and suitability. In further examples, the suitability/risk scores may be a single score indicated a weighting between risk and suitability to indicate an overall appropriateness of the VM instance type 130 for supporting a workload 136.

The computer-readable media 206 may further store code for the compute-management service 134, which may be implemented by one, or multiple, computing devices 112 of the service provider network 102. Generally, the compute-management service 134 may be a service of the service provider network 102 that provides secure, resizable compute capacity and manages the computing resources of the computing-resource network 110. The compute-management service 134 may be referred to in various implementations as an elastic compute service, a virtual machines service, a computing cloud service, a compute engine, or a cloud compute service. In some examples, the compute-management service 134 may perform various functions for managing the computing-resource network 110, such as provisioning VM instances 114, migrating workloads 136 between VM instances 114/116, providing auto-scaling for fleets of VM instances 114, configuring VM instances 114 and/or workloads 136, and/or performing any other functions for managing the computing-resource network 110. In some instances, the compute-management service 134 may receive commands from the optimization service 106 for managing the workloads 136 and/or VM instances 114/116 for users 105 of the service provider network 102.

In some examples, the compute-management service 134 may include an auto-scaling component that, when executed by the processor(s) 202, scales up or down the number of instances 116 available to support one or more workloads 136. For example, the auto-scaling component may provide a fast, efficient, and accurate way to match fleet capacity to usage. In some examples, the auto-scaling component may track the fleet's hosting metrics and determine when to add or remove instances 116 based on a set of guidelines, called policies. The auto-scaling component can adjust capacity in response to changes in demand to help ensure that the fleet of instances 116 has availability for bursts without maintaining an excessive amount of idle resources.

To utilize the services provided by the service provider network 102, users 105 may register for an account with the service provider network 102. For instance, users 105 may utilize a user device 108 to interact with an identity and access management (IAM) component 234 that allows the users 105 to create user accounts 236 with the service provider network 102. Generally, the IAM component 234 may enable the users 105 to manage their workloads 136 and other computing resources securely. Using the IAM component 234, the users 105 may manage their VM instances 114 as described herein. Additionally, users 105 may perform various operations for interacting with the optimization service 106 via their user accounts 236, such as providing input data 120, receiving recommendation data 132, proving input data indicating selections of VM instance types 130, and/or other interactions may be authorized via credentials required to access the user accounts 236.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

FIG. 3 illustrates a graphical user interface (GUI) 300 through which a user 105 of a service provider network 102 can opt-in for a gradual-optimization recommendation 140 for gradually hosting a workload 136 on increasingly optimized VM instances 116.

The GUI 300 may be presented on a user device 108, and accessible via a user account 236 and a console 122. In some examples, the GUI 300 may be part of a web-console wizard that assists the user 105 in selecting an optimized or appropriate VM instance type 130 for a workload 136.

The GUI 300 may include a prompt to choose an opt-in preference to receive a gradual-optimization recommendation 140 generated by the gradual-optimization component 230. The user 105 may select between a first option 302 for receiving optimized instance type recommendations, and a second option 304 for receiving a gradually-optimized instance type recommendations. As illustrated, the first option 302 may result in the user 105 receiving recommendation data 132 that specifies the VM instance types 130 that are most optimal for the workloads 136, but may be drastically different than the current VM instance type 130 that is being used to host the workload 136. The second option 304 may result in the user 105 being provided with VM instance types 130 that gradually move the workload 136 towards more optimal VM instance types 130 in order to slowly illustrate the benefits of right-sizing their VM instance type 130 to users 105.

Upon selecting the second option 304, the user 105 may be presented with various fields that are to be populated in order to provide preferences for generating their gradual-optimization recommendation 140. Initially, the user 105 may be presented with an instance-type option 306 that prompts a user 105 to input an indication as to which of their instance types they would like to enroll for the gradually-optimized instance type recommendations. The user 105 may select one instance type, multiple instance types, or all of their instance types for enrollment. Further, the user 105 may be prompted to enter information around a risk strategy 308 (e.g., low risk, moderate risk, high risk, etc.) that indicates how aggressive (e.g., how tailored) the VM instance types 130 are in the recommended order 144. A higher-risk strategy may result in more narrowly tailored VM instance types 130 being recommended (e.g., less resource overhead allocated to the VM instance types 130 relative to the utilization of the workload 136), and a lower-risk strategy may result in VM instance types 130 that have additional or extra resource overhead to ensure the workloads 136 are not bottlenecked at all.

Further, the user 105 may include an indication of a primary optimization area 310, or the computing resource type that the user 105 would like to ensure is optimized for the workload 136. For instance, the user 105 may desire that CPU be optimized for the workload 136 such that the CPU is never throttled due to insufficient CPU resources allocated by the VM instance type 130. Thus, the primary optimization area 310 may indicate a resource that the user 105 would like to ensure has sufficient overhead, or be somewhat over provisioned, to ensure that there are no performance bottlenecks caused by lack of available CPU cycles.

Additionally, the GUI 300 may present a gradual-optimization process 312 field where the user 105 may select a manual review and approval option 314 or an automated option 318. The manual review and approval option 314 may allow the user 105 to view performance metrics for the VM instance type 130 to determine how well suited the VM instance type 130 is for hosting the workload 136. For instance, the workload 136 may be hosted on a VM instance type 130 in the recommended order 144 for a period of time that is defined by the user 105 (e.g., 14 days in this example).

After that period of time, the gradual-optimization component 230 may analyze resource-utilization data 138 collected for the workload running on the VM instance type 130 and calculate performance data indicating a performance of the VM instance type 130 for hosting the workload 136. The gradual-optimization component 230 may then output performance metrics to the user 105 via the user portal 122, and the user 105 may be able to manually review and approve/disapprove of the VM instance type 130 for hosting the workload 130.

However, if the user selects the automated option 318, the gradual-optimization component 230 may automate the progression of the workload 136 being hosted on different VM instance types 130. For instance, the user 105 may input an acceptable performance threshold, and the gradual-optimization component 230 may gradually progress the workload 136 from being hosted on the different VM instance types 130 in the recommended order 144. The gradual-optimization component 230 may analyze the resource-utilization data 138 and determine whether the VM instance type satisfies the performance threshold (e.g., less than a threshold amount of the allocated computing resources being utilized by the workload 116), and identify an optimized VM instance type 130 from the recommended order 144 based on the performance threshold. The gradual-optimization component 230 may then cause the workload 136 (and/or fleet of workloads) to be hosted on the optimized VM instance type 130, and automate the process of progressing the workload 136 through the different VM instance types 130 of the recommended order 144.

Once the user 105 has completed interacting with the different fields of the GUI 300, the user 105 may select the generate gradual-optimization plan option 320. The various data input into the GUI 300 by the user 105 (e.g., input data 120) may be output from the user device 108 and to the optimization service 106. It should be understood that the GUI 300 is merely illustrative and any type of user interface, or combination of user interfaces, may be utilized to prompt a user 105 for information that describes or defines the preferences around the optimization enrollment. Additionally, any type of input mechanism may be used to receive input data (e.g., input data 120) that can be used to define the input data 120 in addition to text-input fields or drop-down selections.

Figure 4:
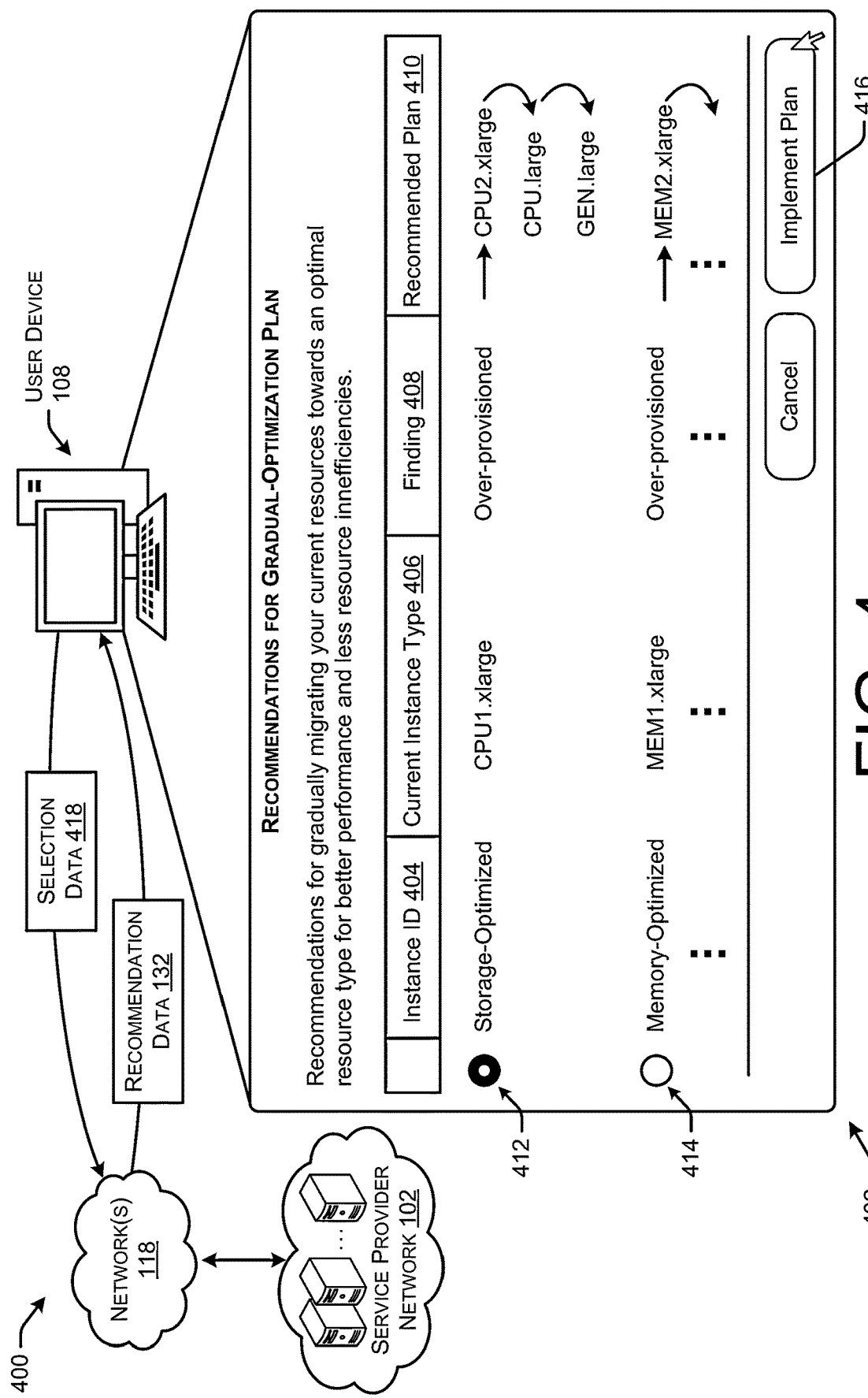
FIG. 4 illustrates a graphical user interface through which a user of a service provider network can review and implement a recommended gradual-optimization plan regarding VM instance types that are optimized to support their workload.

FIG. 4 illustrates a graphical user interface (GUI) 402 through which a user 105 of a service provider network 102 can review and implement a recommended gradual-optimization plan regarding VM instance types 130 that are optimized to support their workload 136.

As illustrated, the user device 108 may receive recommendation data 132 from the service provider network 102. The recommendation data 132 may include a recommended order 144 of a gradual-optimization recommendation 140 that the gradual-optimization component 230 determined at least partly using the input data 120 and the resource-utilization data 138.

The GUI 402 may include various data around the recommended order 144, such as instance IDs 404, current instance types 406 for the workload 136, a finding 408 for the current instance type 406 hosting the workload 136 (e.g., over-provisioned, under-provisioned, etc.), and a recommended plan 410 (e.g., the recommended order 144 of optimized VM instance types 130). As illustrated, the user 105 has a first option 412 to select an instance ID 404 registered to their user account 236, as well as a second option 414 to select another instance ID 404 for an instance registered to their user account 236. The user 105 can select the implement plan option 416 that instructs the gradual-optimization component 230 to implement the recommended order 144 of VM instance types 130 in the gradual-optimization recommendation 140. As illustrated, the recommended plan 410 includes gradually hosting the workload 136 from the current instance type (e.g., CPU1.xlarge) to progressively more optimized VM instance types 130 (e.g., CPU2.xlarge, CPU.large, GEN.large, etc.). As illustrated, the first VM instance type 130 in the recommended plan 410 may be in a same family as the current instance type 406, or otherwise be similar to the current instance type 406, but at least slightly more optimized than the current instance type 406.

Upon selecting the implement plan option 416 (or the cancel option), the user device 108 may generate selection data 418 indicating the selection made by the user 105. For instance, the selection data 418 may indicate that the user 105 would like to implement the recommended plan 410. It should be understood that the GUI 400 is merely illustrative and any type of user interface, or combination of user interfaces, may be utilized to prompt a user 105 for information. Additionally, any type of input mechanism may be used to receive input data that can be used to define the selection data 418, such as text-input fields or drop-down selections.

Figure 5:
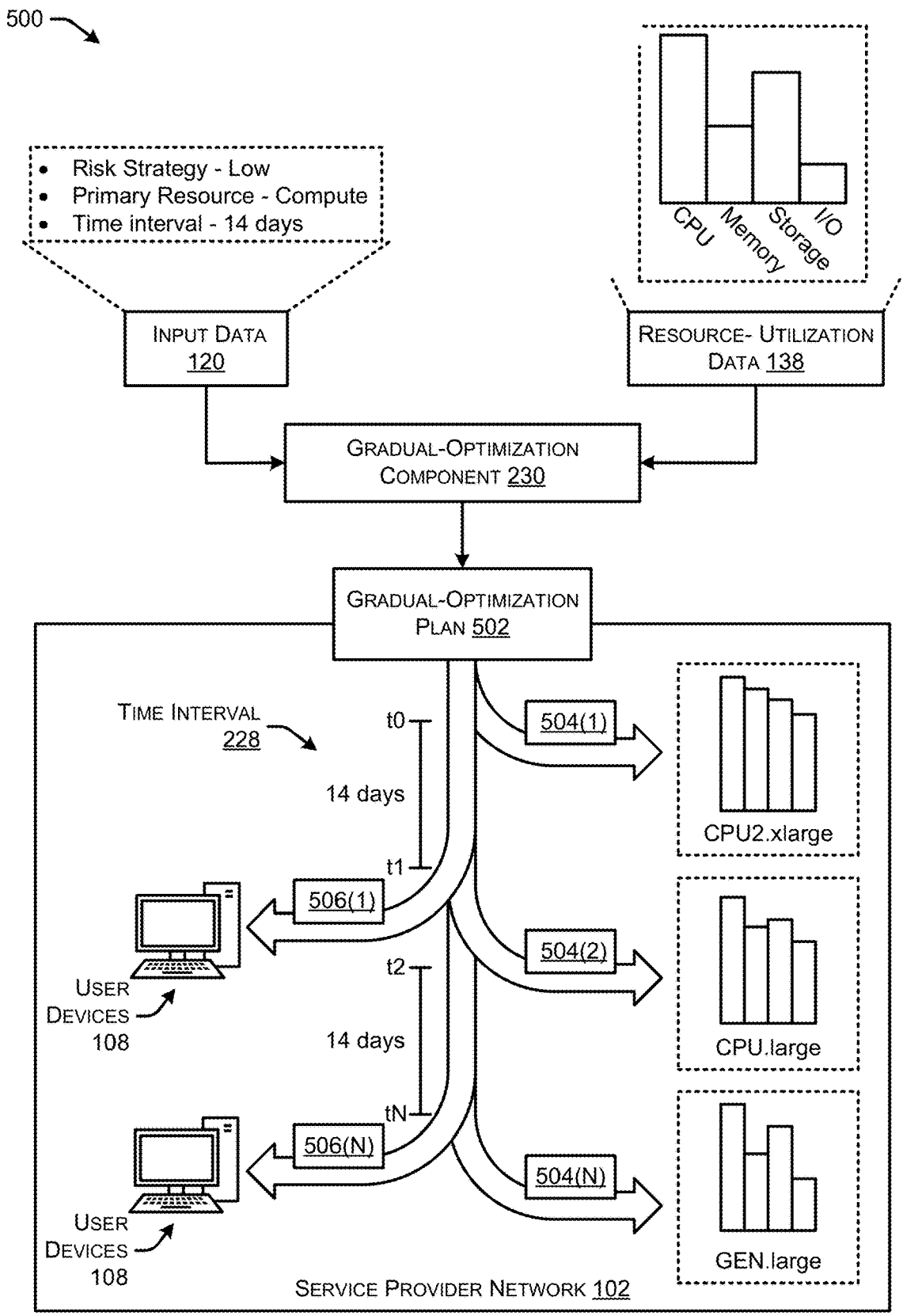
FIG. 5 illustrates a system-architecture diagram of a service provider network that utilizes input data from a user account and utilization data from VM instances and workloads to generate a gradual-optimization plan for the user account.

FIG. 5 illustrates a system-architecture diagram 500 of a service provider network 102 that utilizes input data 120 from a user account 236 and utilization data 138 from VM instances 116 and workloads 136 to generate a gradual-optimization recommendation 140 for the user account 236.

As illustrated, and described above, the input data 120 may include various information such as a risk strategy (e.g., low, high, medium, etc.), a primary resource to be optimized (e.g., compute, memory, disk, etc.), and/or a time interval for which the workload 136 to be hosted on recommended VM instance types 130 and the user 105 can review the performance of the recommended VM instance types 130. In addition to receiving the input data 120, the gradual-optimization component 230 may further receive resource-utilization data 138 indicating the resources consumed by the current VM instance 114 for supporting the workload 136. The gradual-optimization component 230 may receive this data and generate a gradual-optimization plan 502. For instance, the gradual-optimization component 230 may map the resource-utilization data 138 to different VM instance types 130 that are allocated physical computing resources sufficient to support the workload 136 across the different types of computing resources.

The gradual-optimization component 230 may further take into account the risk strategy and/or primary resource when determining what VM instance types 130 are optimized to host the workload 136. As an example, for a low-risk strategy, the gradual-optimization component 230 may identify VM instance types 130 that have more headroom for supporting the workload 136. Further, for a primary resource of CPU that is to be optimized, the gradual-optimization component 230 may identify VM instance types 130 that have sufficient headroom on the CPU allocation to help ensure that CPU is not throttled for the workload 136.

The gradual-optimization plan 502 includes multiple different recommended VM instance types 504(1)-504(N), and also includes providing the user devices 108 with performance data 506(1)-506(N) according to defined time interval 228. That is, if the user 105 selects the gradual-optimization process option 312 as illustrated in FIG. 3, the gradual-optimization component 230 may gradually host the workload 136 on the recommended VM instance types 504, and at the end of the defined time interval 228, provide the user 105 of the user device 108 with performance data 506 indicating how well the workload 136 performed on the recommended VM instance types 504. The user 105 can then determine, based at least partly on the performance data 506, whether or not to continue using the recommended VM instance types 504 in the gradual-optimization plan 502. The user 105 may eventually select a recommended VM instance type 504 for the workload 136, or the workload 136 may ultimately end up being hosted on the most optimal recommended VM instance type 504.

Figure 6:
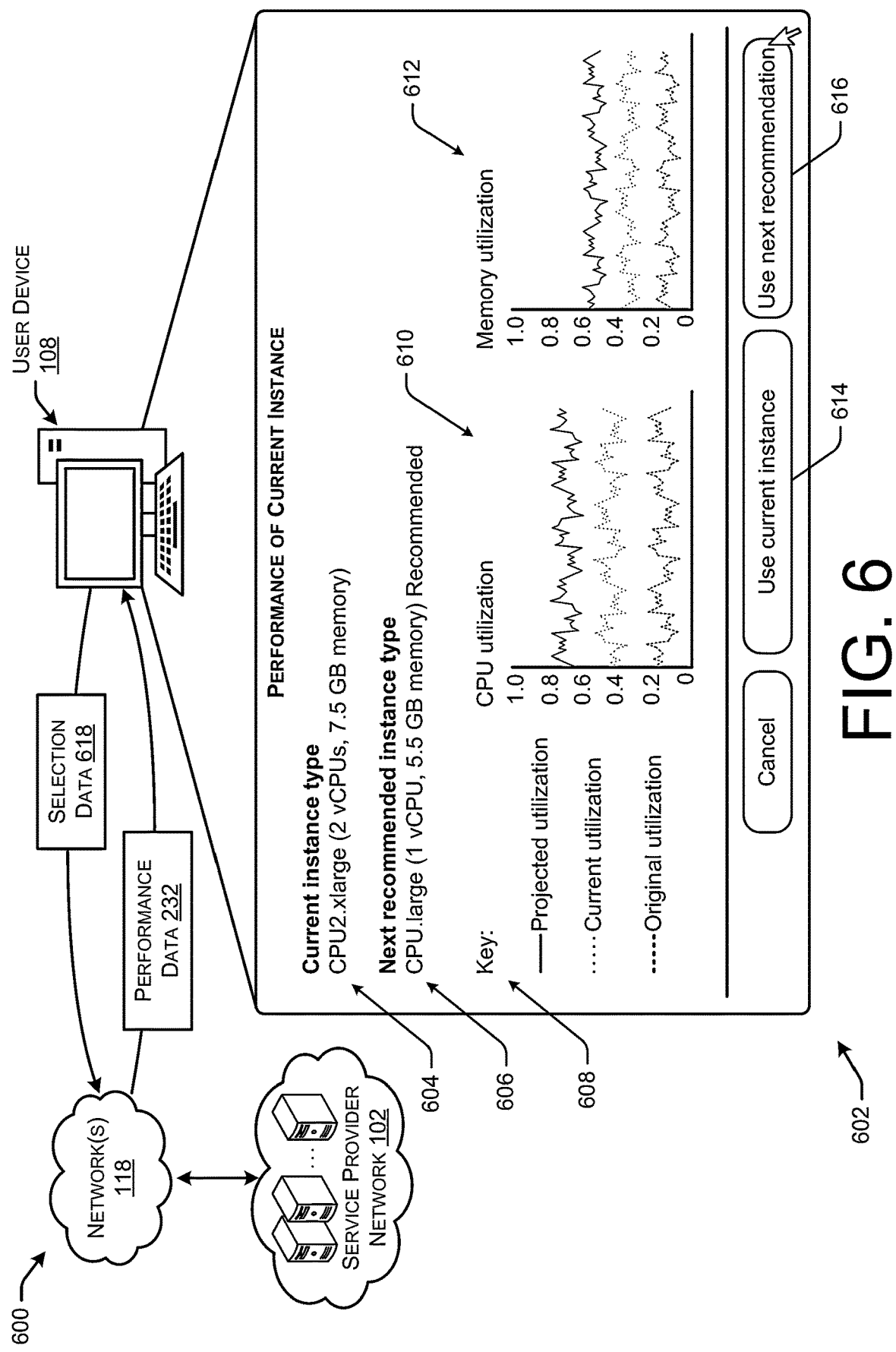
FIG. 6 illustrates a graphical user interface through which a user of a service provider network can review the performance of a recommended VM instance type that hosted their workload, and determine whether to continue using the current VM instance type or use a next recommended instance type in a gradual-optimization plan.

FIG. 6 illustrates a GUI 602 through which a user 105 of a service provider network 102 can review the performance of a recommended VM instance type 130 that hosted their workload 136, and determine whether to continue using the current VM instance type 130 or use a next recommended instance type 130 in a gradual-optimization plan 502.

The user device 108 may receive performance data 232 from the service provider network 102, and display the performance data 232 for the user 105 to view and analyze. The performance data 232 may generally be indicative of a performance of the workload 136 while being hosted on a current instance type 604. The current instance type 604 is listed, and the next recommended instance type 606 in the recommended order 144 is also depicted. As illustrated, the GUI 602 may include a key 608 indicating the projected utilization of the workload 136 on the next recommended instance type, the current utilization of the workload 136 on the current instance type 604, and the original utilization of the workload 136 on the original VM instance type 130.

The GUI 602 may illustrate the performance of the current instance for CPU utilization 610, memory utilization 612, and/or other compute resources not illustrated (e.g., disk, network I/O, etc.). As illustrated, the CPU utilization 610 and memory utilization 612 may gradually be improving or increasing. For instance, the current utilization of the underlying resources allocated to the current VM instance type 604 by the workload 136 may be a more optimal percentage (e.g., roughly 40%-50%) compared to the original utilization of the underlying resources allocated to the original VM instance type (e.g., roughly 10%-20%). Similarly, the current utilization of the underlying resources allocated to the next recommended VM instance type 606 by the workload 136 may be a more optimal percentage (e.g., roughly 70%-80%) compared to the original utilization of the underlying resources allocated to the current VM instance type 604 (e.g., roughly 40%-50%).

The user 105 may analyze the performance data 232 indicating the performance of the different VM instance types 130 (e.g., original type, current type, and next recommended type, etc.). The user 105 may then determine whether they would like to continue using the current instance and select the first option 614, or if they would like to select the second option 616 and use the next recommended instance type 606 (or cancel and revert back to the original VM instance type 130). Based on the input, the user device 108 may generate selection data 618 and send the selection data to the gradual-optimization component 230 of the service provider network 102 in order to host the workload 136 on the desired VM instance type 130.

It should be understood that the GUI 600 is merely illustrative and any type of user interface, or combination of user interfaces, may be utilized to prompt a user 105 for information that indicates their preferred VM instance type 130. Additionally, any type of input mechanism may be used to receive selection data 618 that can be used to define the selection data 618.

FIGS. 7A, 7B, 8, and 9 illustrate flow diagrams of example methods 700, 800, and 900 that illustrate aspects of the functions performed at least partly by the service provider network 102 as described in this disclosure. The logical operations described herein with respect to FIGS. 7A, 7B, 8, and 9 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, and 9 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7A:
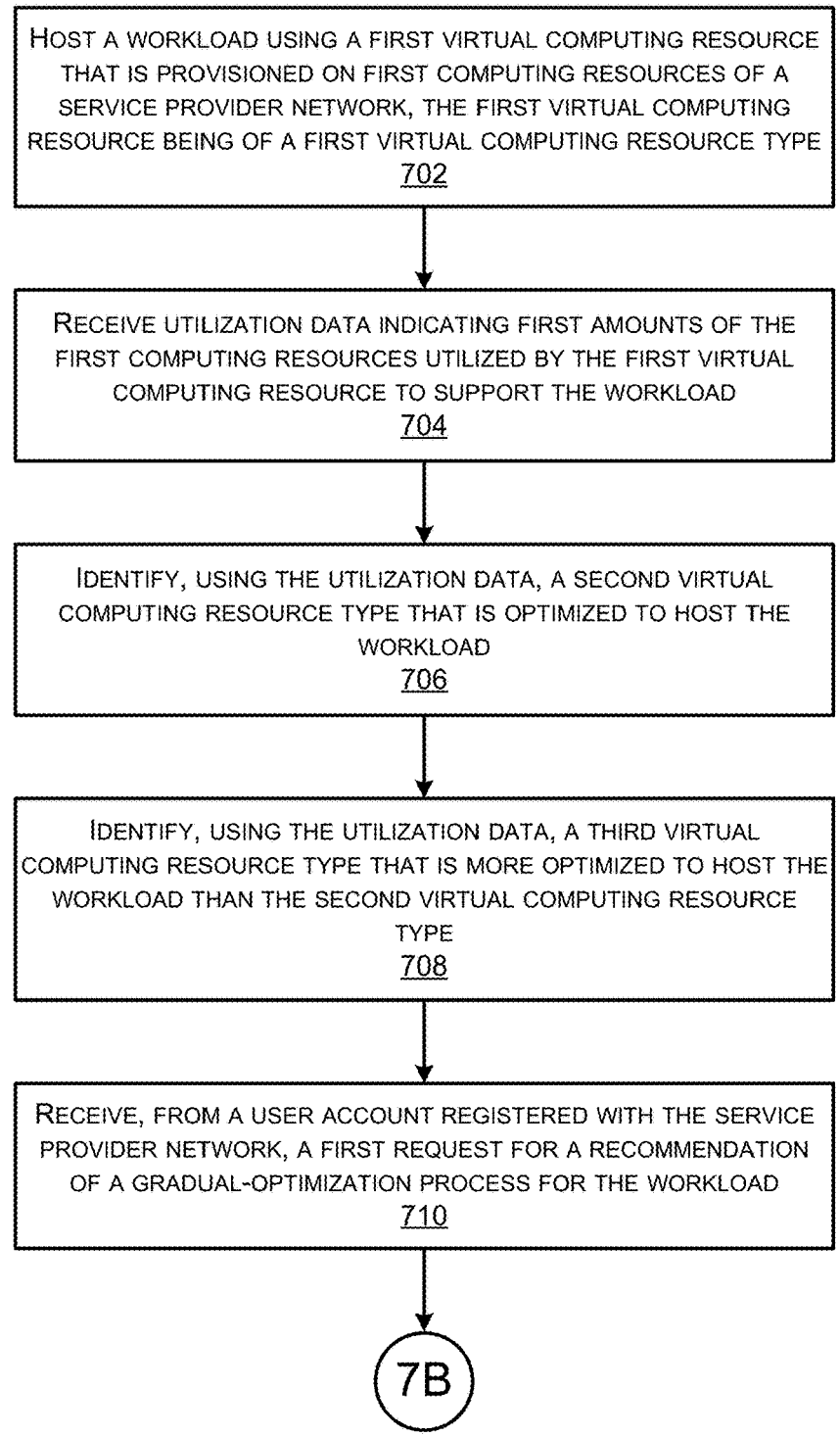
FIGS. 7A and 7B collectively illustrate a flow diagram of an example method for a service provider network to receive utilization data for a workload, determine multiple VM instance types that are optimized for the workload, and provide the user account with a recommendation as to a gradual-optimization process for gradually hosting the workload on more optimized VM instance types.
Figure 7B:
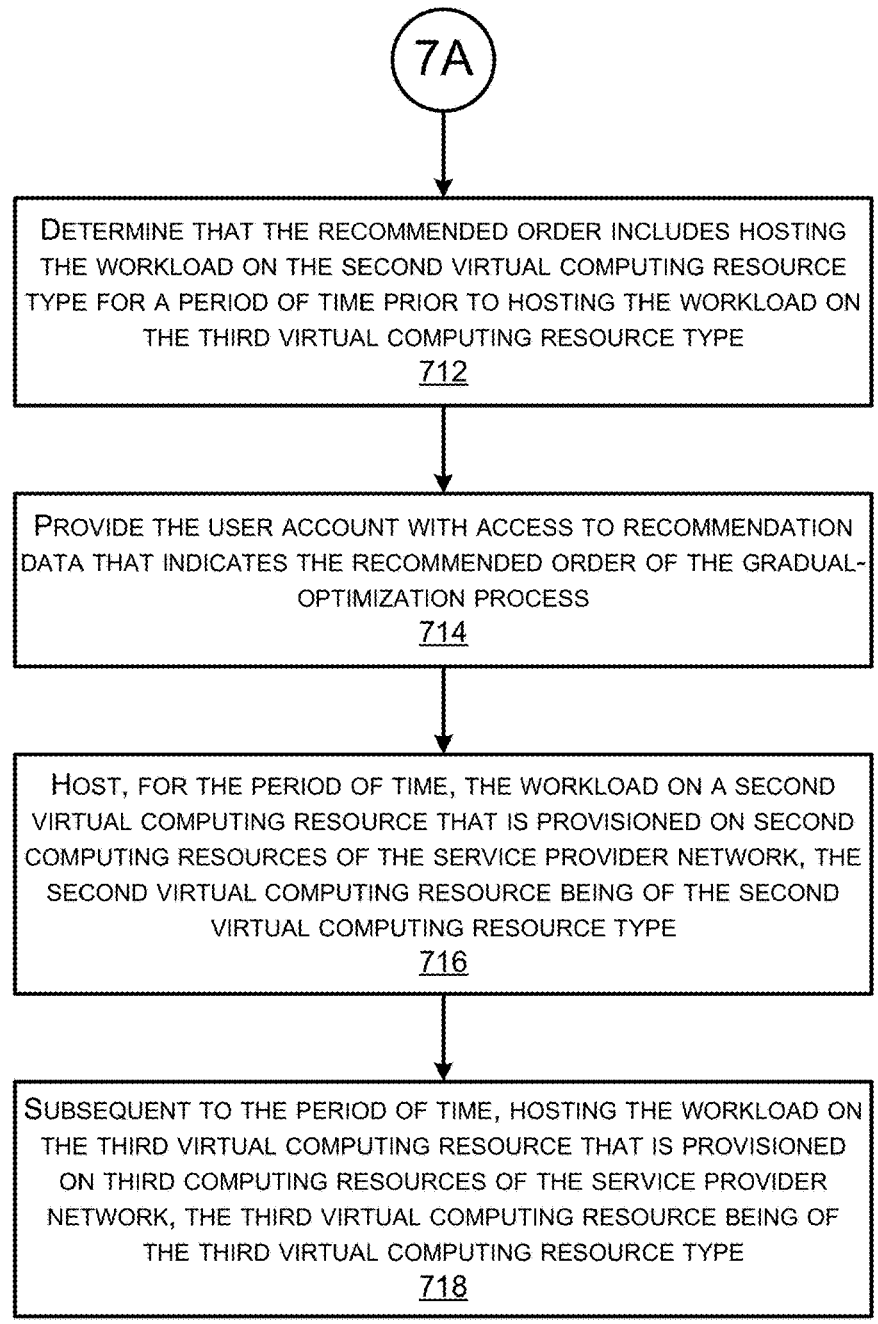

FIGS. 7A and 7B collectively illustrate a flow diagram of an example method 700 for a service provider network 102 to receive utilization data 138 for a workload 136, determine multiple VM instance types that are optimized for the workload 136, and provide the user account 236 with a recommendation 140 as to a gradual-optimization process for gradually hosting the workload on more optimized VM instance types 130.

At 702, a service provider network 102 may host a workload using a first virtual computing resource that is provisioned on first computing resources of a service provider network. The first virtual computing resource may be of a first virtual computing resource type that is allocated a particular amount of the first computing resources.

At 704, the service provider network 102 may receive utilization data indicating first amounts of the first computing resources utilized by the first virtual computing resource to support the workload. For instance, the optimization service 106 may receive utilization data 138 indicating amounts of computing resources utilization by the first VM instance type 130 to support the workload 136.

At 706, the service provider network 102 may identify, using the utilization data, a second virtual computing resource type that is optimized to host the workload. For instance, the optimization service 106 may map the utilization data 138 to second VM instance type 130 that is more optimized to host the workload 136.

At 708, the service provider network 102 may further identify, using the utilization data, a third virtual computing resource type that is more optimized to host the workload than the second virtual computing resource type. Thus, the optimization service 106 may further map the utilization data 138 to a third VM instance type 130 that is more optimized to host the workload 136 than the second VM instance type 130.

At 710, the service provider network 102 may receive, from a user account registered with the service provider network, a first request for a recommendation of a gradual-optimization process for the workload. In some instances, the gradual-optimization process may include a recommended order of virtual computing resource types on which the workload is to be hosted. For instance, a user 105 of a user account 236 may provide input via a portal, such as GUI 300, indicating a request to provide a gradual-optimization process for the workload 136.

At 712, the service provider network 102 may determine that the recommended order includes hosting the workload on the second virtual computing resource type for a period of time prior to hosting the workload on the third virtual computing resource type. That is, the recommended order 144 may recommend that the workload 136 be hosted on a less optimized VM instance type 130 before the more optimized instance type 130 to gradually migrate the workload 136 to more optimized VM instance types 130.

At 714, the service provider network 102 may provide the user account with access to recommendation data that indicates the recommended order 144 of the gradual-optimization process. For instance, the user 105 may access the user account 236 to view a portal, such as GUI 402, in order to view the recommended plan 410.

At 716, the service provider network 102 may host, for the period of time, the workload on a second virtual computing resource that is provisioned on second computing resources of the service provider network. In such examples, the second virtual computing resource being of the second virtual computing resource type. The period of time may be defined via the option 316 in the GUI 300 as described herein.

At 718, the service provider network 102 may, subsequent to the period of time, host the workload on the third virtual computing resource that is provisioned on third computing resources of the service provider network where the third virtual computing resource being of the third virtual computing resource type. That is, after the predefined time interval, the service provider network 102 may host the workload 136 on the more optimized VM instance type 130 after the workload 136 being hosted on the less optimized VM instance type 130.

In some instances, the method 700 may further include determining a performance metric indicating a performance of the second virtual computing resource while hosting the workload and providing the user account with access to performance data that indicates the performance metric, such as the information presented in GUI 602. The method 700 may further include receiving input from the user account indicating a second request for the workload to be hosted on the third virtual computing resource.

In various examples, the method 700 may further include receiving, via the user account, an indication of a risk threshold that specifies an acceptable measure of risk for the gradual-optimization process as illustrated at option 308, and determining that the second virtual computing resource type and the third virtual computing resource type are to be included in the recommended order based at least in part on the acceptable measure of risk.

Figure 8:
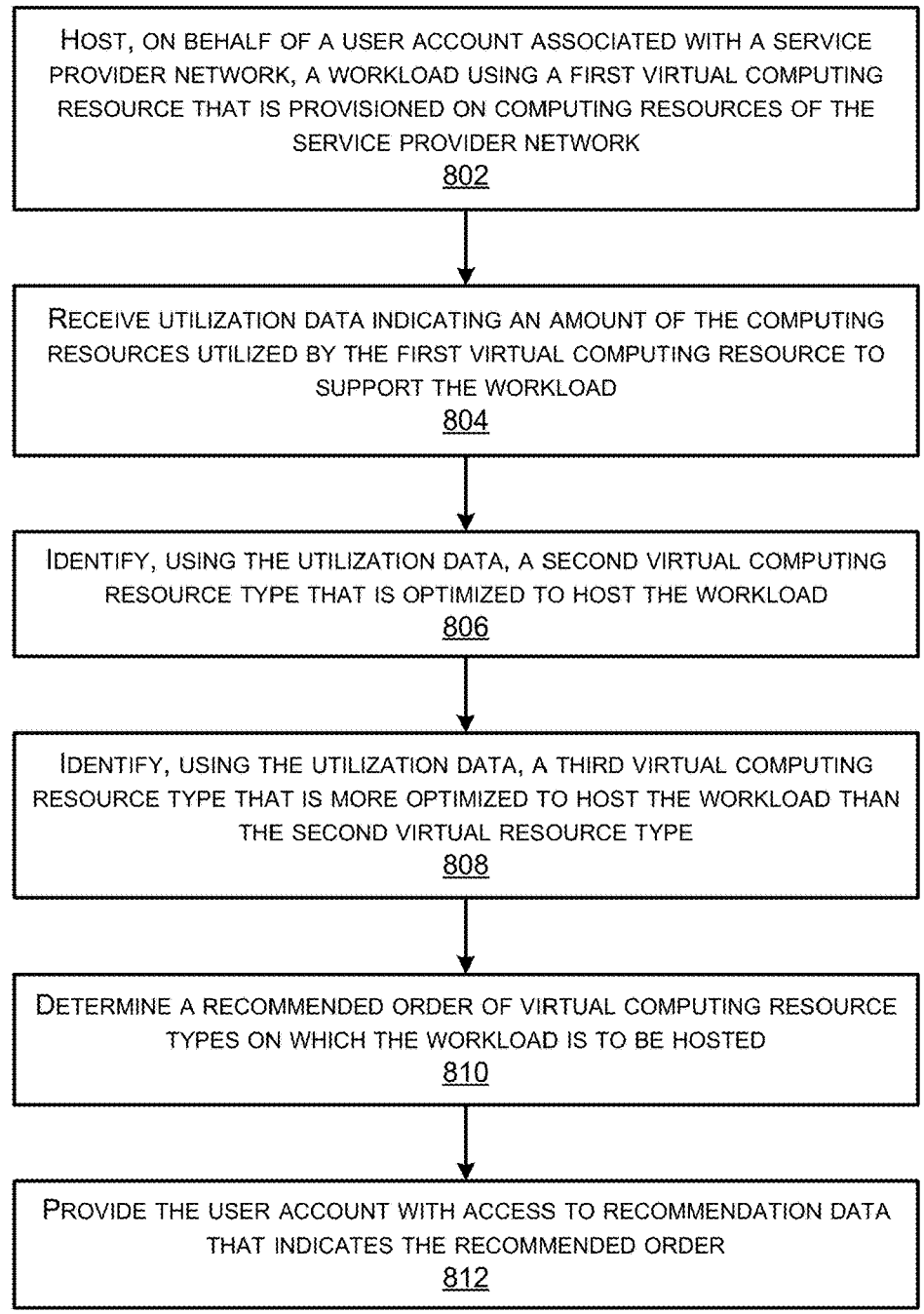
FIG. 8 illustrates a flow diagram of an example method for a service provider network to receive a resource-utilization data for a workload, and provide a recommended order of VM instance types that gradually become more optimized for hosting the workload.

FIG. 8 illustrates a flow diagram of an example method 800 for a service provider network 102 to receive a resource-utilization data 138 for a workload 136, and provide a recommended order 144 of VM instance types 130 that gradually become more optimized for hosting the workload 136.

At 802, the service provider network 102 may host, on behalf of a user account 236 associated with the service provider network 102, a workload 136 using a first virtual computing resource that is provisioned on computing resources of the service provider network where the first virtual computing resource being of a first virtual computing resource type.

At 804, the service provider network 102 may receive utilization data 138 indicating an amount of the computing resources utilized by the first virtual computing resource to support the workload. At 806, the service provider network 102 may identify, using the utilization data 138, a second virtual computing resource type that is optimized to host the workload 136. For instance, the service provider network 102 may map the utilization data 138 of the workload 136 to the second VM instance type 130 that is optimized to host the workload 136.

At 808, the service provider network 102 may identify, using the utilization data, a third virtual computing resource type that is more optimized to host the workload than the second virtual resource type. For instance, the service provider network 102 may map the utilization data 138 of the workload 136 to the third VM instance type 130 that is more optimized to host the workload 136 than the second VM instance type 130.

At 810, the service provider network 102 may determine a recommended order 144 of virtual computing resource types 130 on which the workload 136 is to be hosted. Generally, the recommended order 144 including hosting the workload 136 on the second virtual computing resource type prior to hosting the workload on the third virtual computing resource type. That is, the recommended order 144 gradually moves the workload 136 onto more optimized VM instance types 130.

At 812, the service provider network 102 may provide the user account 236 with access to recommendation data 132 that indicates the recommended order 144. For instance, the service provider network 102 may provide the user account 236 with access to a GUI 402 that illustrates the recommended plan 410 (e.g., recommended order 144).

Figure 9:
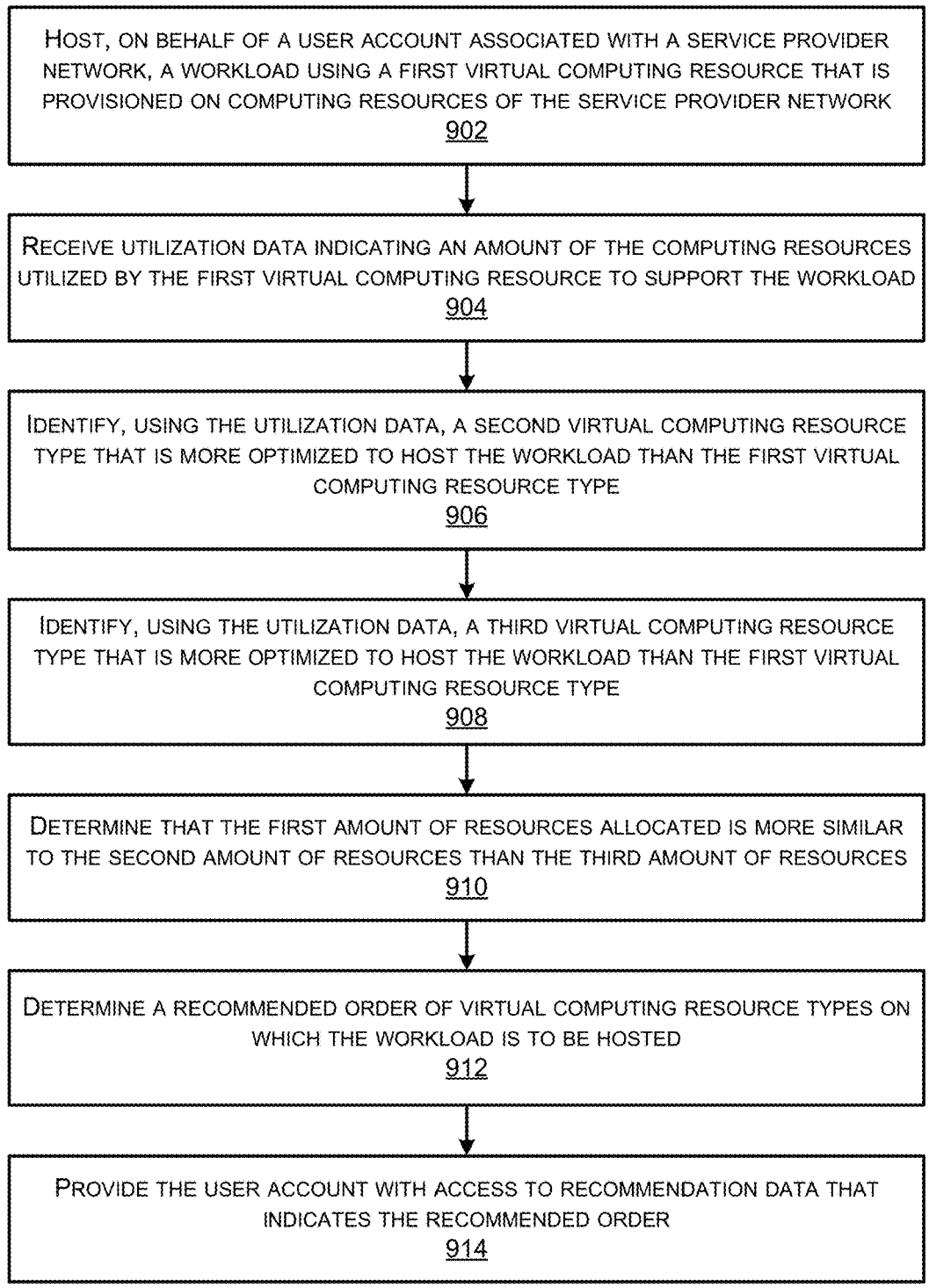
FIG. 9 illustrates a flow diagram of an example method for a service provider network to receive a resource-utilization data for a workload, identify multiple VM instance types that are optimized for the workload, and provide a recommendation that the workload initially be hosted on an optimized VM instance type that is similar to the VM instance type currently hosting the workload.

FIG. 9 illustrates a flow diagram of an example method 900 for a service provider network 102 to receive a resource-utilization data 138 for a workload, identify multiple VM instance types 130 that are optimized for the workload 136, and provide a recommendation that the workload 136 initially be hosted on an optimized VM instance type 130 that is similar to the VM instance type 130 currently hosting the workload 136.

At 902, the service provider network 102 may host, on behalf of a user account, a workload using a first virtual computing resource that is provisioned on computing resources of the service provider network. Generally, the first virtual computing resource may be of a first virtual computing resource type allocated a first amount of computing resources for use.

At 904, the service provider network 102 may receive utilization data 138 indicating an amount of the computing resources utilized by the first virtual computing resource to support the workload. At 906, the service provider network 102 may identify, using the utilization data, a second virtual computing resource type that is more optimized to host the workload than the first virtual computing resource type. For instance, the service provider network 102 may map the utilization data 138 of the workload 136 to a second VM instance type 130 that is optimized to host the workload 136 based on the utilization data 138. In such examples, the second virtual resource type 130 may be allocated a second amount of computing resources to host the workload 136.

At 908, the service provider network 102 may identify, using the utilization data 138, a third virtual computing resource type that is more optimized to host the workload than the first virtual computing resource type. For instance, the service provider network 102 may map the utilization data 138 of the workload 136 to a third VM instance type 130 that is optimized to host the workload 136 based on the utilization data 138. In some examples, the third virtual resource type 130 may be allocated a third amount of computing resources to host the workload 136.

At 910, the service provider network 102 may determine that the first amount of resources is more similar to the second amount of resources than the third amount of resources. That is, the first amount of resources allocated to the first VM instance type 130 may be more similar to the second amount of resources allocated to the second VM instance type 130 than the third amount of resources allocated to the third VM instance type 130. In some instances, the first VM instance type 130 and second VM instance type 130 may be in a same VM instance type family or offering.

At 912, the service provider network 102 may determine a recommended order 144 of virtual computing resource types on which the workload 136 is to be hosted where the recommended order 144 includes hosting the workload 136 on the second virtual computing resource type 130 prior to hosting the workload 136 on the third virtual computing resource type 130. That is, the workload 136 is initially hosted on a second VM instance type 130 that is more similar to the current, first VM instance type 130 than the third VM instance type.

At 914, the service provider network 102 may provide the user account 138 with access to recommendation data 132 that indicates the recommended order 144. For instance, the service provider network 102 may provide recommendation data 132 to the user device 108, and the recommended plan 410 may be presented in the GUI 402.

Figure 10:
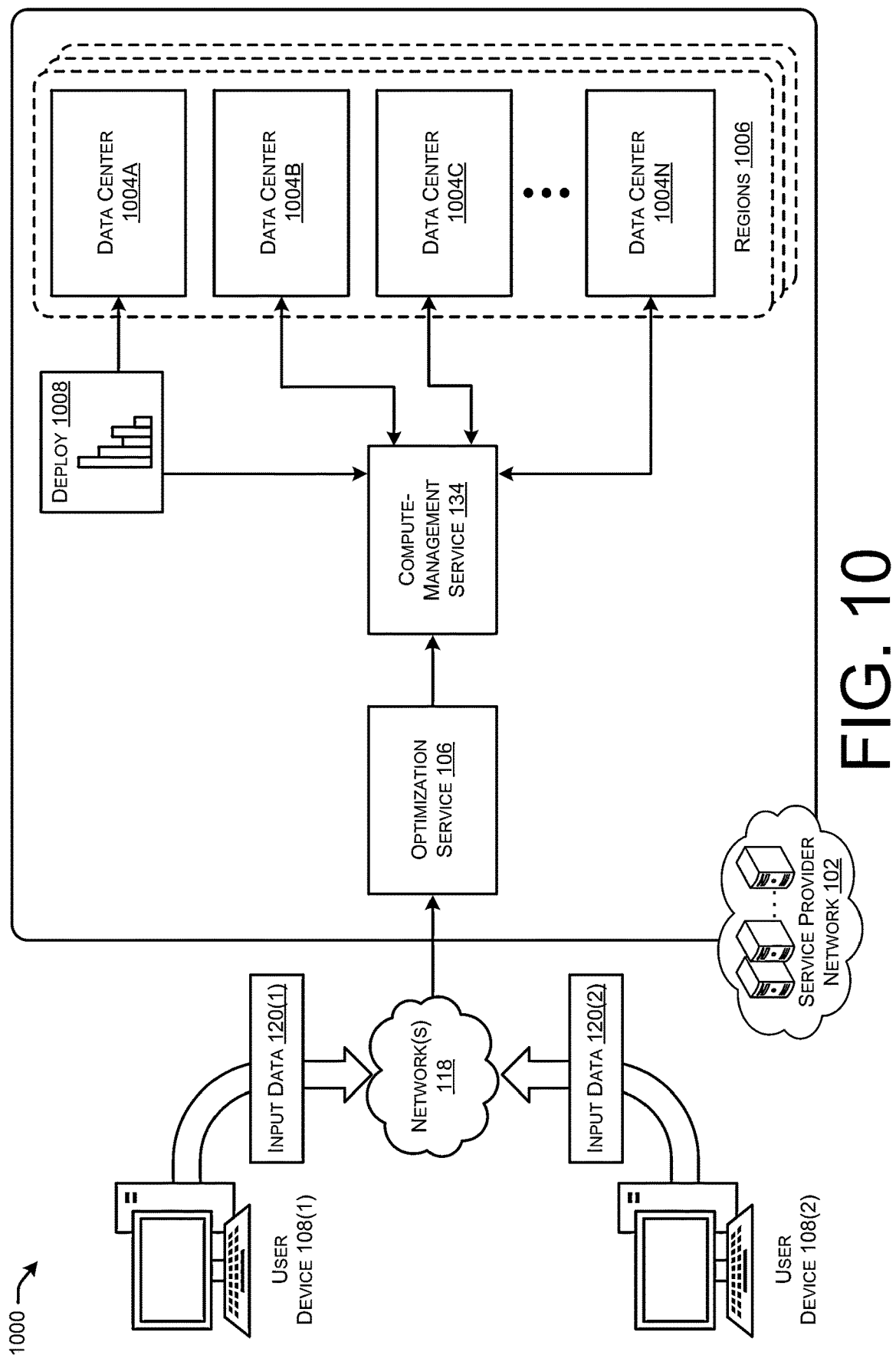
FIG. 10 is a system and network diagram that shows an illustrative operating environment that includes data centers of a service provider network that can be configured to implement aspects of the functionality described herein.

FIG. 10 is a system and network diagram 1000 that shows an illustrative operating environment that includes data centers 1004 in one or more regions 1006 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be config-ured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 22.

The users 105 of the user devices 108 that utilize the service provider network 102 may access the computing resources provided by the service provider network 102 over any wired and/or wireless network(s) 118, which can be a wide area communication network ("WAN"), such as the Internet, an intranet or an Internet service provider ("ISP") network or a combination of such networks. For example, and without limitation, a user device 108 operated by a user 105 of the service provider network 102 may be utilized to access the service provider network 102 by way of the network(s) 118. It should be appreciated that a local-area network ("LAN"), the Internet, or any other networking topology known in the art that connects the data centers 1004 to remote clients and other users can be utilized. It should also be appreciated that combinations of such networks can also be utilized.

As illustrated, user devices 108(1) and 108(2) may submit input data 120(1) and 120(2) for generating a gradual-optimization plan for hosting workloads hosted in the computing-resource network 110. In some examples, the input data 120(1) and 120(2) may be associated with a same user account 236, or with different user accounts 236. The optimization component 126 may then generate gradual-optimization plans, and the compute-management service 134 may determine where to deploy 1008 workloads on various VM instance types 130 in the data centers 1004.

Figure 11:
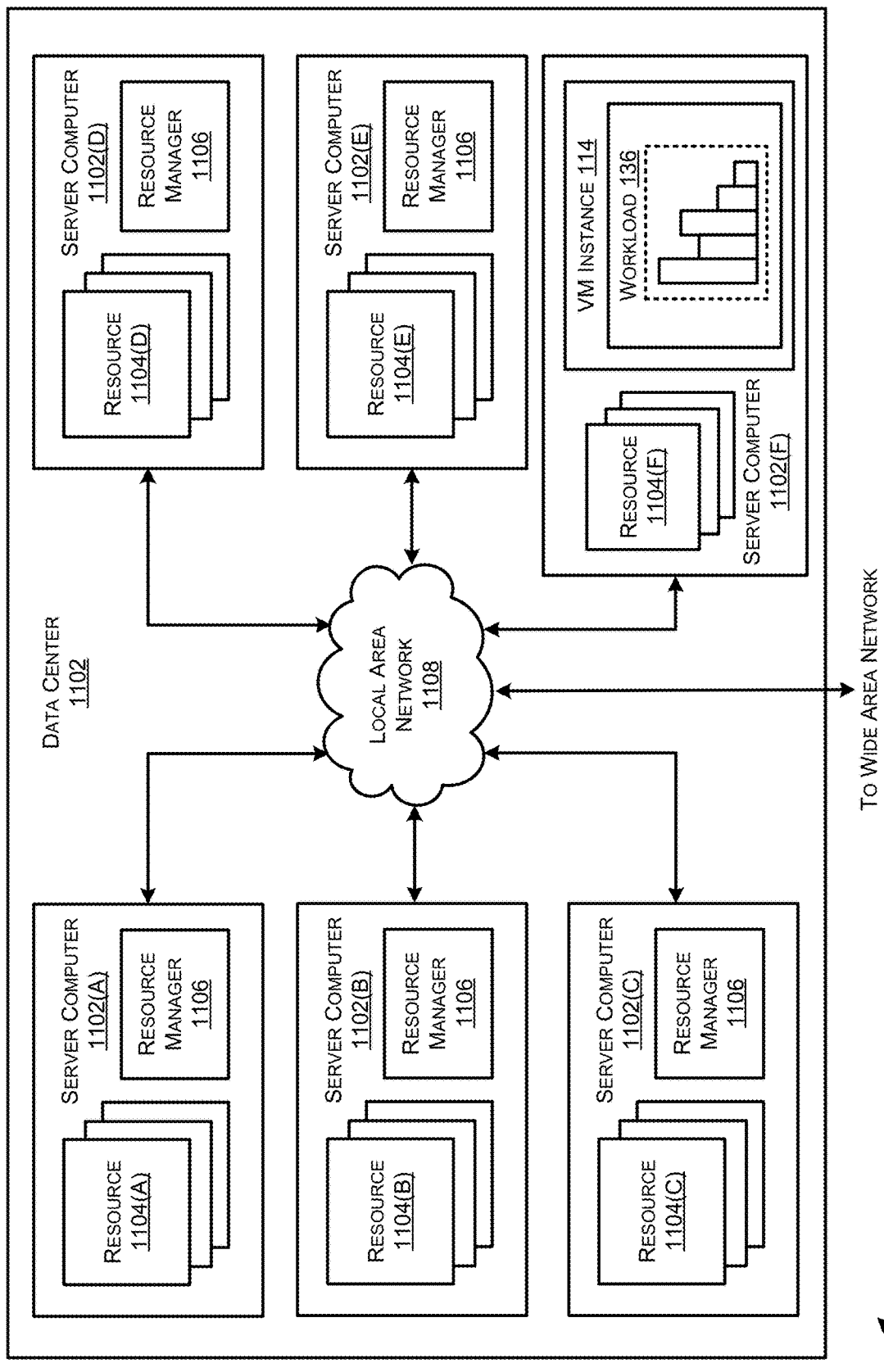
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices 112 described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

The data center 1004 shown in FIG. 11 also includes a server computer 1102F that can execute some or all of the software components described above. For example, and without limitation, the server computer 1102F (and the other server computers 1102) can generally be included in to the computing devices 112 of FIG. 1 and be configured to execute components, including the components of the optimization service 106, the compute-management service 134, the computing-resource network 110, and/or the other software components described above. The server computer 1102F can also be configured to execute other components and/or to store data for providing some or all of the functionality described herein. In this regard, it should be appreciated that the services illustrated in FIG. 11 as executing on the server computer 1102F can execute on many other physical or virtual servers in the data centers 1104 in various embodiments.

Figure 12:
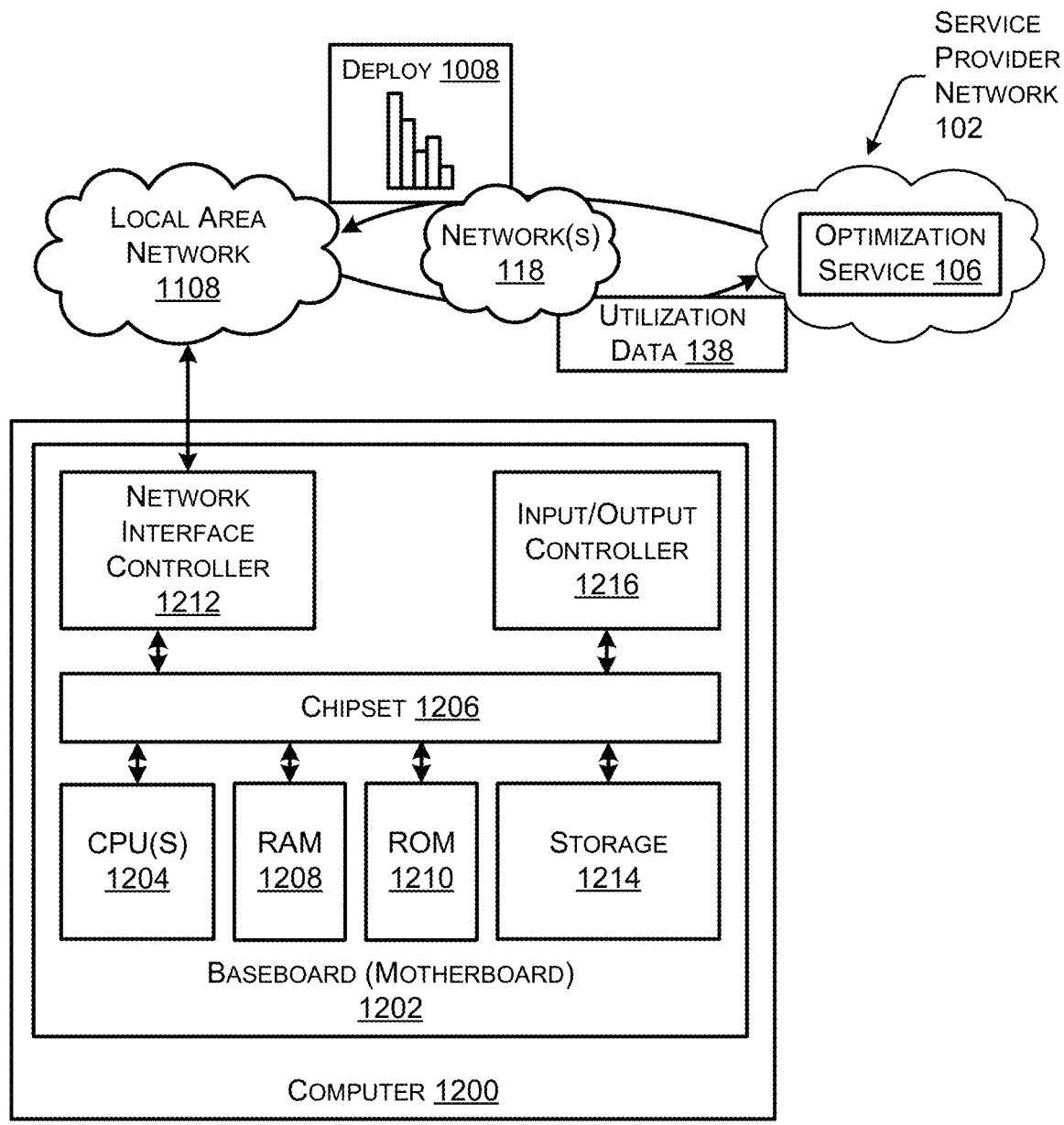
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. In some examples, the server computer 1200 may correspond to, or be the same as or similar to, a computing device 112 described in FIG. 1.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or 118). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD- ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

Generally, the computer 1200 may be an example of a computing device 112 (and other computing devices, servers, etc.) described herein. The CPU(s) 1204, RAM 1208, ROM 1210, storage 1214, bandwidth of the NIC 1212, and/or other resources of the computer 120 may be allocated to one or more different VM instances 114 as described herein based on the VM instance types 114.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
hosting, on behalf of a user account registered with a service provider network, a workload using a first virtual computing resource that is provisioned on computing resources of the service provider network, the first virtual computing resource being of a first virtual computing resource type;
receiving, by a service of the service provider network, utilization data indicating first amounts of the computing resources utilized by the first virtual computing resource to support the workload, wherein:
the first virtual computing resource is allocated first allocated amounts of the computing resources upon being provisioned on the computing resources; and
the first allocated amounts of the computing resources have a first difference from the first amounts of the computing resources, the first difference indicating first idle resources of the first allocated amounts of the computing resources;
determining that the first virtual computing resource is oversubscribed for hosting the workload based on the first difference;
identifying a second virtual computing resource of a second virtual computing resource type that is allocated second allocated amounts of the computing resources;
identifying a third virtual computing resource of a third virtual computing resource type that is allocated third allocated amounts of the computing resources;
receiving, from the user account, a first request for a recommendation of a gradual-optimization process for the workload, the gradual-optimization process including a recommended order of virtual computing resource types on which the workload is to be hosted, the recommended order of virtual computing resource types having progressively less idle resources while supporting the workload;
determining that the second virtual computing resource type is less oversubscribed and will have less idle resources when hosting the workload than the first virtual computing resource type based on the second allocated amounts of the computing resources and the first amounts of the computing resources;
determining that the third virtual computing resource type is less oversubscribed and will have less idle resources when hosting the workload than the second virtual computing resource type based on the third allocated amounts of the computing resources and the first amounts of the computing resources;
determining, based at least in part on (i) the second virtual computing resource type being less oversubscribed and having less idle resources when hosting the workload than the first virtual computing resource type and (i1) the third virtual computing resource type being less oversubscribed and having less idle resources when hosting the workload than the second virtual computing resource type, that the recommended order includes hosting the workload on the second virtual computing resource type for a period of time prior to hosting the workload on the third virtual computing resource type;
providing the user account with access to recommendation data that indicates the recommended order of the gradual-optimization process;
hosting, for the period of time, the workload on the second virtual computing resource that is provisioned on the computing resources of the service provider network, the second virtual computing resource being of the second virtual computing resource type; and
subsequent to the period of time, hosting the workload on the third virtual computing resource that is provisioned on the computing resources of the service provider network, the third virtual computing resource being of the third virtual computing resource type.

2. The method of claim 1, further comprising:
receiving, via the user account, an indication of a risk threshold that specifies an acceptable measure of risk for the gradual-optimization process; and
determining that the second virtual computing resource type and the third virtual computing resource type are to be included in the recommended order based at least in part on the acceptable measure of risk.

3. The method of claim 1, further comprising:
receiving, from the user account, an indication of a particular type of computing resource that is to be optimized for the workload;
determining that the second virtual computing resource type is optimized to provide the particular type of computing resource; and
determining that the third virtual computing resource type is optimized to provide the particular type of computing resource.

4. A system comprising:
one or more processors; and
one or more computer-readable media storing instructions that, when executed by the one or more processors, cause the one or more processors to perform operations comprising:
hosting, on behalf of a user account associated with a service provider network, a workload using a first virtual computing resource that is provisioned on computing resources of the service provider network, the first virtual computing resource being of a first virtual computing resource type;

obtaining, from the computing resources, utilization data indicating an amount of the computing resources utilized by the first virtual computing resource to support the workload during a previous period of time, the first virtual computing resource being allocated a first allocated amount of the computing resources upon being provisioned on the computing resources;

receiving a first request for a gradual-optimization process for the workload, the gradual-optimization process including a recommended order of virtual computing resource types on which the workload is to be hosted, the recommended order of virtual computing resource types having progressively less idle resources while supporting the workload;

identifying, using the utilization data, a second virtual computing resource of a second virtual computing resource type that is allocated a second allocated amount of the computing resources;

determining, based on a first difference between the second allocated amount of the computing resources and a particular amount of the computing resources utilized by the workload, that the second virtual computing resource type results in less idle computing resources than the first virtual computing resource type when hosting the workload;

identifying, using the utilization data, a third virtual computing resource of a third virtual computing resource type that is allocated a third allocated amount of the computing resources;

determining, based on a second difference between the third allocated amount of the computing resources and the particular amount of the computing resources utilized by the workload, that the third virtual computing resource type results in less idle computing resources than the second virtual computing resource type when hosting the workload;

determining the recommended order of virtual computing resource types on which the workload is to be hosted, the recommended order including hosting the workload on the second virtual computing resource type prior to hosting the workload on the third virtual computing resource type such that progressively less idle resources are available when the workload utilizes the particular amount of the computing resources;

providing the user account with access to recommendation data that indicates the recommended order;

hosting, for a first period of time and based at least in part on the recommended order, the workload on the second virtual computing resource of the second virtual computing resource type; and subsequent to the first period of time, hosting, for a second period of time, the workload on the third virtual computing resource of the third virtual computing resource type based at least in part on the recommended order.

5. The system of claim 4, the operations further comprising:

receiving, via the user account, an indication of an acceptable measure of risk for the recommended order; and determining that the second virtual computing resource type and the third virtual computing resource type are to be included in the recommended order based at least in part on the acceptable measure of risk.

6. The system of claim 4, the operations further comprising:

hosting the workload on a second virtual computing resource that is provisioned on the computing resources of the service provider network, the second virtual computing resource being of the second virtual computing resource type; and determining a performance metric indicating a performance of the second virtual computing resource while hosting the workload;

providing the user account with access to performance data that indicates the performance metric; and receiving input from the user account indicating a second request for the workload to be hosted on the third virtual computing resource.

7. The system of claim 4, the operations further comprising:

receiving, from the user account, an indication of a particular type of computing resource that is to be optimized for the workload;

determining that the second virtual computing resource type is optimized to provide the particular type of computing resource; and determining that the third virtual computing resource type is optimized to provide the particular type of computing resource.

8. The system of claim 4, the operations further comprising:

receiving first input from the user account indicating a request to provision the workload on a second virtual computing resource of the second virtual computing resource type;

providing the user account with access to performance data that indicates a performance of the second virtual computing resource while hosting the workload; and receiving second input from the user account indicating a request to provision the workload on a third virtual computing resource of the third virtual computing resource type.

9. The system of claim 4, the operations further comprising:

hosting the workload on a second virtual computing resource of the second virtual computing resource type;

determining that a performance metric indicating a performance of the second virtual computing resource while hosting the workload satisfies a threshold performance metric; and determining to host the workload on a third virtual computing resource of the third computing resource type based at least in part on the performance metric satisfying the threshold performance metric.

10. The system of claim 4, the operations further comprising:

determining that the first allocated amount of computing resources is more similar to the second allocated amount of computing resources than to the third allocated amount of computing resources; and determining that the second virtual computing resource type is to host the workload prior to the third virtual computing resource type based at least in part on the first allocated amount of computing resources being more similar to the second allocated amount of computing resources than to the third allocated amount of computing resources.

11. A method comprising:

hosting, on behalf of a user account associated with a service provider network, a workload using a first virtual computing resource that is provisioned on computing resources of the service provider network, the first virtual computing resource being of a first virtual computing resource type and the first virtual computing resource being allocated use of a first amount of computing resources upon being provisioned on the computing resources;

obtaining, from the computing resources, utilization data indicating a particular amount of a computing resource of the computing resources utilized by the first virtual computing resource to support the workload;

identifying, using the utilization data, a second virtual computing resource of a second virtual computing resource type that is allocated a second amount of computing resources that, if used to host the workload at a future time while utilizing the particular amount of the computing resource, would result in less idle computing resources than the first virtual computing resource type to host the workload;

identifying, using the utilization data, a third virtual computing resource of a third virtual computing resource type that is allocated a third amount of computing resources that, if used to host the workload at the future time while utilizing the particular amount of the computing resource, would result in less idle computing resources than the second virtual computing resource type to host the workload;

determining a recommended order according to which the workload is hosted on the second virtual computing resource type prior to being hosted on the third virtual computing resource type such that progressively less idle resources are available when the workload utilizes the particular amount of the computing resources;

providing the user account with access to recommendation data that indicates the recommended order;

hosting, for a period of time and based at least in part on the recommended order, the workload on the second virtual computing resource of the second virtual computing resource type; and subsequent to the period of time, hosting the workload on the third virtual computing resource of the third virtual computing resource type based at least in part on the recommended order.

12. The method of claim 11, further comprising:
receiving, via the user account, an indication of an acceptable measure of risk for the recommended order; and
determining that the second virtual computing resource type and the third virtual computing resource type are to be included in the recommended order based at least in part on the acceptable measure of risk.

13. The method of claim 11, further comprising:
receiving, from the user account, an indication of a particular type of computing resource that is to be optimized for the workload;

determining that the second virtual computing resource type is optimized to provide the particular type of computing resource; and
determining that the third virtual computing resource type is optimized to provide the particular type of computing resource.

14. The method of claim 11, further comprising:
receiving first input from the user account indicating a request to provision the workload on a second virtual computing resource of the second virtual computing resource type;
providing the user account with access to performance data that indicates a performance of the second virtual computing resource while hosting the workload; and
receiving second input from the user account indicating a request to provision the workload on a third virtual computing resource of the third virtual computing resource type.

15. The method of claim 11, further comprising:
hosting the workload on a second virtual computing resource of the second virtual computing resource type;
determining that a performance metric indicating a performance of the second virtual computing resource while hosting the workload satisfies a threshold performance metric; and
determining to host the workload on a third virtual computing resource of the third computing resource type based at least in part on the performance metric satisfying the threshold performance metric.

16. The method of claim 11, further comprising:
determining that the first amount of computing resources is less than the second amount of computing resources;
determining that second amount of computing resources is less than the third amount of computing resources; and
determining that the second virtual computing resource type is to host the workload prior to the third virtual computing resource type based at least in part on the first amount of computing resources being less than the second amount of computing resources and the second amount of computing resources being less than the third amount of computing resources.

17. The method of claim 11, further comprising providing the user account with access to text data indicating that the recommended order includes a gradual migration of the workload to a virtual computing resource type that is more optimized for hosting the workload than the first virtual computing resource type.

18. The method of claim 11, further comprising providing the user account with access to text data indicating that the recommended order includes a gradual migration of the workload to virtual computing resource types that have less resource inefficiencies and less idle resources.

* * * * *